United States Patent
Buco et al.

(10) Patent No.: US 8,332,267 B2
(45) Date of Patent: *Dec. 11, 2012

(54) METHOD AND SYSTEM FOR REAL TIME MEASUREMENT DATA ADJUDICATION AND SERVICE LEVEL EVALUATION

(75) Inventors: Melissa Jane Buco, Amawalk, NY (US); Rong Nickle Chang, Pleasantville, NY (US); Laura Zaihua Luan, Putnam Valley, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,265

(22) Filed: Nov. 7, 2011

(65) Prior Publication Data

US 2012/0054342 A1    Mar. 1, 2012

Related U.S. Application Data

(63) Continuation of application No. 11/500,210, filed on Aug. 7, 2006, now Pat. No. 8,126,756.

(51) Int. Cl.
   *G06Q 10/00* (2012.01)
(52) U.S. Cl. .................... 705/12; 705/7.22; 705/7.38
(58) Field of Classification Search ........ 705/7.11–7.42; 718/105; 717/101; 709/220, 223, 225, 229; 714/24; 370/252, 465
   See application file for complete search history.

(56) References Cited

U.S. PATENT DOCUMENTS

| | | | |
|---|---|---|---|
| 5,359,509 A | 10/1994 | Little et al. | |
| 6,269,401 B1 | 7/2001 | Fletcher et al. | |
| 6,321,264 B1 | 11/2001 | Fletcher et al. | |
| 6,701,342 B1 | 3/2004 | Bartz et al. | |
| 6,782,421 B1 | 8/2004 | Soles et al. | |
| 6,959,335 B1 | 10/2005 | Hayball et al. | |
| 7,082,463 B1 | 7/2006 | Bradley et al. | |
| 7,120,694 B2 | 10/2006 | Sinha | |

(Continued)

OTHER PUBLICATIONS

Buco, et al.; Managing eBusiness on Demand SLA Contracts in Business Terms using the Cross-SLA Execution Manager SAM; Sixth International Symposium on Autonomous Decentralized Systems (ISADS 2003) Piza, Italy, 2003; pp. 157-164.

(Continued)

*Primary Examiner* — R. David Rines
(74) *Attorney, Agent, or Firm* — Schmeiser, Olsen & Watts; Louis J. Percello

(57) ABSTRACT

A method and system for adjudicating measurement data in real time and re-adjudicating a segment of an input measurement data stream upon submission of a new adjudication instruction in a service level evaluation system. An adjudication instruction associated with a service level is received. Measurement data including a first measurement data point is received. The received adjudication instruction is applied in real time to the first measurement data point to generate a first adjudicated measurement data point. A service level is evaluated based on the first adjudicated measurement data point. To re-adjudicate the data stream segment, a new adjudication instruction is received and the segment is identified. The input data stream's adjudication is suspended and the stream is queued into storage. The segment of measurement data is retrieved and re-adjudicated by applying the new adjudication instruction. The input data stream's adjudication is resumed afterwards from the queued input stream.

20 Claims, 15 Drawing Sheets

U.S. PATENT DOCUMENTS

| | | | |
|---|---|---|---|
| 2002/0143920 | A1 | 10/2002 | Dev et al. |
| 2003/0154123 | A1 | 8/2003 | Subbloie et al. |
| 2003/0191665 | A1 | 10/2003 | Fitzgerald et al. |
| 2004/0172313 | A1 | 9/2004 | Stein et al. |
| 2006/0133296 | A1 | 6/2006 | Berthaud et al. |
| 2008/0126148 | A1 | 5/2008 | Buco et al. |

OTHER PUBLICATIONS

Buco, et al.; Utility Computing SLA management based upon business objectives; IBM Systems Journal, vol. 32, No. 1, 2004; pp. 159-178.

Sahai, et al.; Specifying and Monitoring Guarantees in Commercial Grids through SLA; Internet Systems and Storage Laboratory, HP Laboratories, Palo Alto HPL-2002-324, Nov. 14, 2002; 9 pages.

Sahai, et al.; Automated SLA Monitoring for Web Services; HP Laboratiries, 1501 Page Mill Road, Palo Alto, CA 94034, {firstname_lastname_}@hpl.hp.com; 26 pages.

Office Action (Mail Date Jun. 21, 2011) for U.S. Appl. No. 11/500,210, filed Aug. 7, 2006; Confirmation No. 3027.

Amendment dated Sep. 21, 2011 in response to Office Action (Mail Date Jun. 21, 2011) for U.S. Appl. No. 11/500,210, filed Aug. 7, 2006; Confirmation No. 3027.

Notice of Allowance (Mail Date Oct. 17, 2011) for U.S. Appl. No. 11/500,210, filed Aug. 7, 2006; Confirmation No. 3097.

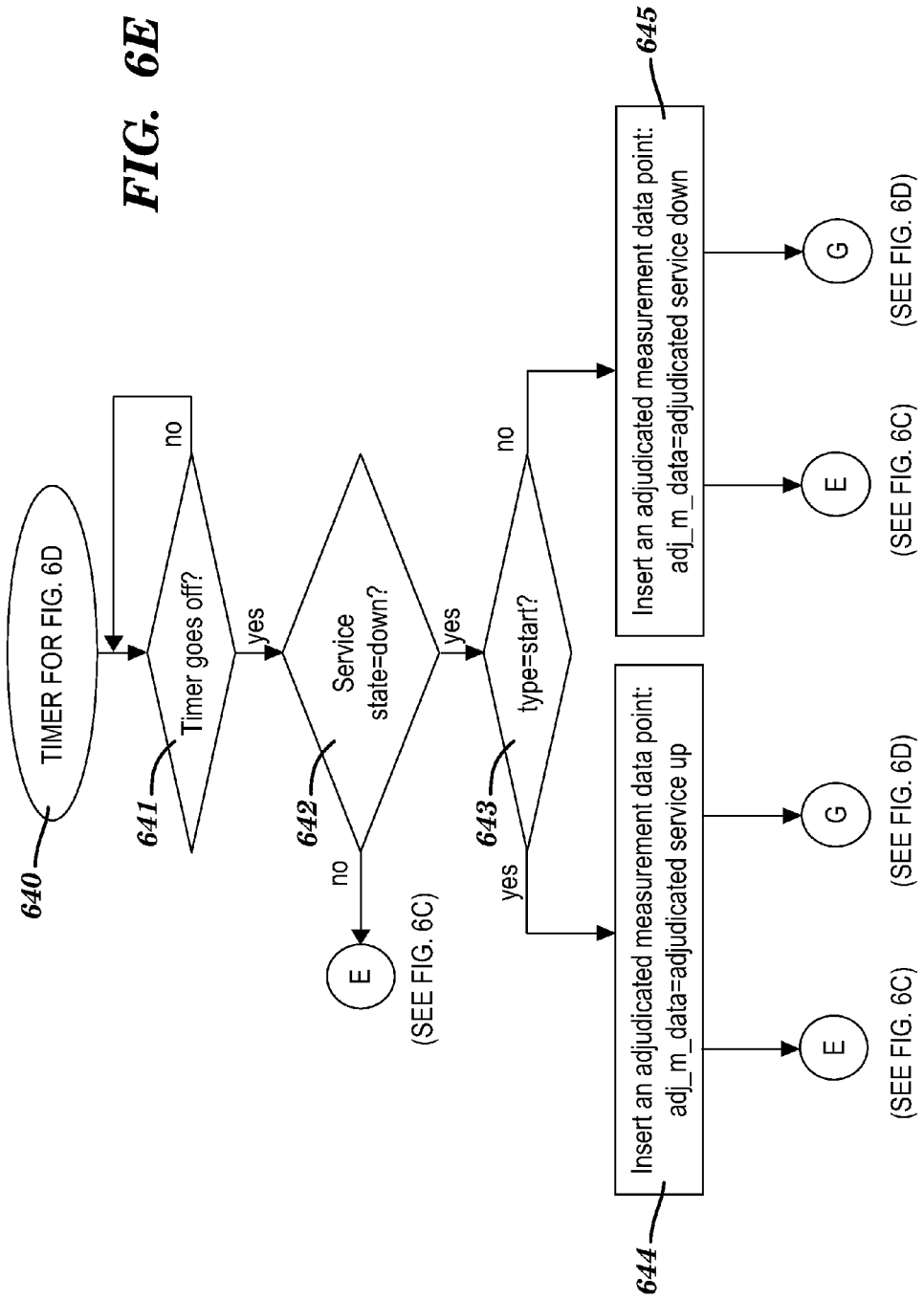

METHOD AND SYSTEM FOR REAL TIME MEASUREMENT DATA ADJUDICATION AND SERVICE LEVEL EVALUATION

This application is a continuation application claiming priority to Ser. No. 11/500,210, filed Aug. 7, 2006.

FIELD OF THE INVENTION

The present invention relates to a method and system for real time measurement data adjudication and service level evaluation, and more particularly to a technique for real time measurement data adjudication and service level attainment evaluation that facilitates the management of computing services.

BACKGROUND OF THE INVENTION

Conventional systems (e.g., computing services management systems and claims processing systems in the insurance industry) that perform service level evaluations employ manual, offline adjudication of measurement data. Further, known techniques for service level evaluations perform manual adjudication after an evaluation period ends (e.g., availability or response time is recalculated for a monthly service level evaluation after the completion of a calendar month). Being manual and non-real time processes, these conventional techniques are time-consuming and hinder effective and proactive management of business operations. In cases where new adjudication records are submitted into the system after an initial adjudication and the amount of original measurement data is large, conventional re-evaluation and re-adjudication of the complete set of original measurement data is a slow process that taxes computing resources, thereby decreasing system capacity and increasing blocking time. Thus, there exists a need to overcome at least one of the preceding deficiencies and limitations of the related art.

SUMMARY OF THE INVENTION

In first embodiments, the present invention provides a computer-implemented method of adjudicating measurement data and evaluating service levels in real time, comprising:

receiving a first adjudication instruction at a computing system, the first adjudication instruction associated with a service level obligation specified by a service level agreement (SLA) between a provider of a computing service and a requester of the computing service, the service level obligation having a target value specified by the SLA;

receiving a plurality of measurement data points at the computing system, wherein the receiving the plurality of measurement data points includes receiving a first measurement data point of the plurality of measurement data points;

adjudicating, by the computing system, each measurement data point of the plurality of measurement data points in response to each measurement data point being received at the computing system via the receiving the plurality of measurement data points, the adjudicating including automatically applying in real time the first adjudication instruction to the first measurement data point in response to the receiving the first measurement data point, the automatically applying including generating a first adjudicated measurement data point; and evaluating, by the computing system, a service level attainment of the computing service subsequent to the automatically applying, the evaluating being based on the first adjudicated measurement data point, and the evaluating including calculating the service level attainment and comparing the service level attainment to the target value.

A system and computer program product corresponding to the above-summarized method are also described and claimed herein.

In second embodiments, the present invention provides a computer-implemented method of re-adjudicating a segment of a measurement data stream, comprising:

receiving a measurement data stream at a computing system, the measurement data stream including a plurality of segments;

adjudicating the measurement data stream by the computing system, the adjudicating producing an adjudicated measurement data stream based on one or more adjudication instructions, and the adjudicating associated with one or more service level obligations and one or more service level agreements (SLAs);

evaluating one or more service level attainments by the computing system, the evaluating based on the adjudicated measurement data, the evaluating including calculating a service level attainment of the one or more service level attainments and comparing the service level attainment to one or more targets of a service level obligation of the one or more service level obligations;

receiving an adjudication instruction at the computing system subsequent to the evaluating, the adjudication instruction not included in the one or more adjudication instructions;

identifying, by the computing system and via the adjudication instruction, the service level obligation, an SLA of the one or more SLAs, the SLA associated with the service level obligation, and a segment of the plurality of segments, the segment requiring re-adjudication based on the adjudication instruction, and the service level attainment capable of being re-evaluated by the computing system based on the segment;

suspending, by the computing system, a portion of the adjudicating associated with the service level obligation and the SLA;

queuing a portion of the measurement data stream associated with the service level obligation and associated with the SLA in a data store of the computing system;

retrieving a set of measurement data associated with the segment; and re-adjudicating the retrieved set of measurement data, the re-adjudicating including applying the adjudication instruction to the retrieved set of measurement data to produce re-adjudicated measurement data.

Advantageously, the present invention provides real time measurement data adjudication and up-to-date service level evaluation results that facilitate proactive management of business operations in a computing services environment. Further, the segmented re-adjudication process of the present invention limits re-adjudication to only the affected measurement data segment, thereby reducing the bandwidth required for re-loading original measurement data and the number of computation cycles for re-adjudication. Still further, the segmented re-adjudication process provides a faster system response to re-adjudication requests and therefore reduces the buffering of incoming measurement data streams and decreases the impact on shared resources for evaluating other service levels and other SLA contracts where the system supports simultaneous evaluations of multiple SLA contracts.

BRIEF DESCRIPTION OF THE DRAWINGS

FIGS. 6C-6E depict a flow diagram of a process for applying individual exclusion adjudication instructions to an availability measurement stream in real time, which produces adjudicated measurement data within the process of FIGS. 6A-6B, in accordance with embodiments of the present invention.

DETAILED DESCRIPTION OF THE INVENTION

Overview

The present invention is a real time service level attainment evaluation system with the capability of adjudicating measurement data streams in real time and providing segmented re-adjudication in response to a submission of new adjudication instructions. Hereinafter, for simplicity, the service level attainment evaluation system of the present invention is also referred to as a service level evaluation system, an evaluation system, or a service level management system. Original measurement data is generated, for example, by a monitoring system, and is input into the evaluation system as input data streams or sequences of event messages. Service level evaluation requires a collection of the original measurement data and an adjudication of the measurement data in accordance with adjudication instructions that are based on terms of a Service Level Agreement (SLA), where the adjudication is performed prior to a service level calculation. A service level attainment is calculated using adjudicated measurement data to provide an up-to-date evaluation of whether an SLA-specified target service level is attained in an evaluation period. Timely service level attainment information is important in, for example, an on-demand business environment where service providers need to proactively manage service delivery.

Service Level Evaluation System

Figure 1:
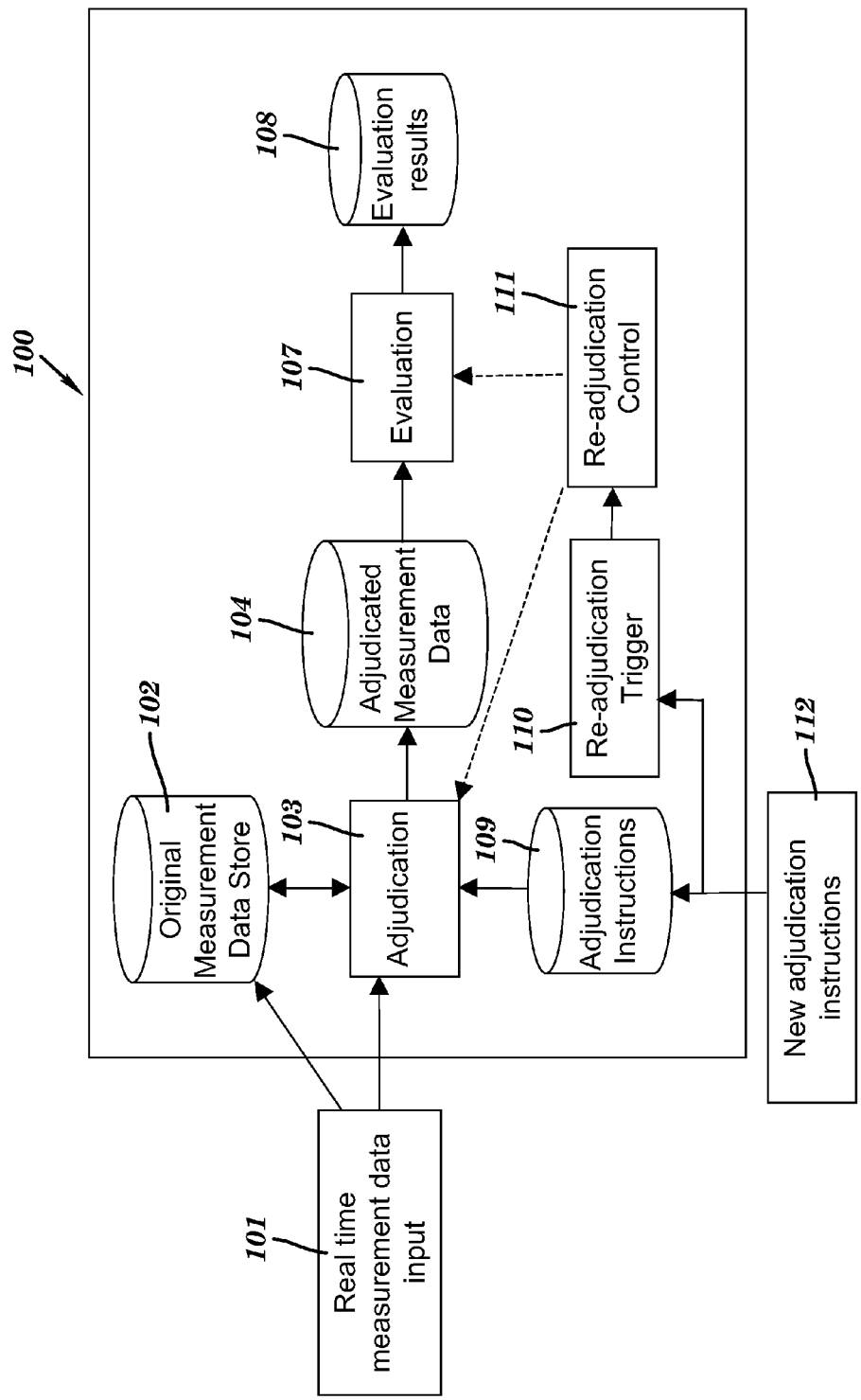
FIG. 1 is block diagram of a first embodiment of a system for adjudicating measurement data and evaluating service levels in real time, in accordance with embodiments of the present invention.

FIG. 1 is block diagram of a first embodiment of a system (i.e., service level evaluation system) for adjudicating measurement data and evaluating service levels in real time, in accordance with embodiments of the present invention. It should be noted that system 100 can be implemented on a distributed computing system comprised of multiple data stores and data processing systems. One or more monitoring systems provide original measurement data input 101 (e.g., measurement data streams), which is input in real time via communication channels into an adjudication module 103. Original measurement data input 101 can be, for example, multiple measurement data streams that are input into system 100 in parallel. System 100 associates each measurement data stream with one or more appropriate SLA contracts.

Original measurement data can be a significant amount of data for each evaluation time period. As an example, if measurement data is collected from periodic service probing performed every five minutes, the calculation of service down time in an evaluation period of one month uses over 8,000 data points.

Measurement data input 101 is stored in an original measurement data store 102 accessible by adjudication module 103 for re-adjudication and auditing purposes. In another embodiment, original measurement data store 102 is external to system 100 and accessible by adjudication module 103.

For each service level per SLA contract, adjudication module 103 applies adjudication instructions stored in an adjudication instructions store 109 to the measurement data input and produces corresponding SLA contract specific adjudicated measurement data 104. In another embodiment, adjudication instructions store 109 is external to system 100. If an external adjudication instructions store 109 is used, a communications mechanism is employed by system 100 to facilitate submission of new adjudication instructions and/or changes to existing adjudication instructions. An evaluation module 107 calculates a service level in accordance with a SLA contract using the adjudicated measurement data and produces service level evaluation results 108.

As used herein, adjudication is defined as a data processing technique that modifies data, excludes data or inserts additional data used in a service level evaluation. Examples of data modification, exclusion, and insertion for adjudication are provided below relative to the discussion of measurement data point treatments.

As used herein, an adjudication instruction is defined as a set of data that defines a treatment of one or more specified measurement data points in an evaluation of a service level attainment for one or more specified SLA contracts. A service level is a level of a computing service which is provided by a service provider. As used herein, a service level attainment is defined as a calculated value of a service level that is based on measurement data input and that represents a performance level of a service provider at a given time, where the calculated value is to be compared to one or more target values of a service level obligation. As used herein, a service level obligation is a term of a SLA that includes one or more target values, condition(s) under which one or more comparisons are made between a specified target value and a service level attainment, and action(s) to be performed as a result of the comparison(s) (e.g., a specific discount is provided by the service provider if the target value is not achieved). As used herein, a target value is defined as a particular value of a service level specified in a SLA, and whose achievement and/or non-achievement by the service provider results in action(s) that are required to be performed by the terms of the SLA. Terms of a SLA are agreed to by the service provider and a requester of the computing service. The terms of the SLA provide an incentive for the service provider to provide the computing service at a level that meets or surpasses (i.e., is an improvement upon) a specified target value.

Categories of measurement data point treatments specified by adjudication instructions include:

1. Modification of measurement data points;
2. Exclusion of measurement data points from a service level attainment calculation; and
3. Insertion of additional measurement data points.

As an example of the modification of a measurement data point, consider an SLA clause that requires a company to respond to a customer's request for additional storage within a specified period of time (e.g., two hours) or else the company will have to provide a discount to the customer. The SLA defines the start of the specified period as the timestamp of an email that informs the company of the request and the end of the specified period as the timestamp of an email sent by the company to the customer which notifies the customer of the added storage. The SLA also provides for a modification of the start and/or end of the specified period if a dispute arises as to the sending of a relevant email. For instance, if an email system failure causes the email sent to the customer to have a late timestamp (e.g., after the two-hour period has elapsed), then an adjudication can be implemented that modifies the end time of the specified period so that the email timestamp is within the specified period.

As an example of the exclusion of a measurement data point, an adjudication instruction excludes from service level calculations the measurement data points that measure the availability of a Web service during a maintenance window scheduled for Feb. 1, 2007 22:00:00 to Feb. 1, 2007 23:59:00 for SLA contract xxx. As another exclusion example, consider an outage of a computing service that occurred in a specified past time period due to uncontrollable causes such as a natural disaster or due to excusable reasons specified in an SLA contract. Later, an adjudication is performed by submitting an adjudication instruction to exclude from service level calculations the measurement data points collected during the specified past time period.

As an example of the insertion of additional measurement data points, consider a temporary failure of a monitoring system that prevents the sending of some measurement data to a service level management system. Before the monitoring system recovers, service level calculations are performed. After the monitoring system recovers, the missing measurement data is recovered and is sent to the service level management system. An adjudication is performed to add the recovered measurement data to the applicable time period and the service levels are re-calculated.

Adjudication instructions are submitted into system 100 against, for instance, existing or future measurement data. As a first example, an outage period due to an uncontrollable cause such as a natural disaster is an exceptional exclusion time period that is submitted in an adjudication instruction after the fact and against the measurement data of a specified time period in the past. As a second example, a scheduled future maintenance window is used to exclude measurement data of a specified time period in the future.

One or more new adjudication instructions 112 are submitted into adjudication instructions store 109. For example, a customer account representative decides that an outage period is to be excluded from a service level calculation and utilizes a user interface via a web browser to submit a new adjudication instruction 112 that specifies a time window for the exclusion. As used herein, a new adjudication instruction is an adjudication instruction submitted to a computing system after a previously submitted set of one or more adjudication instructions has been employed to evaluate a service level via the real time adjudication process described herein.

Re-adjudication trigger 110 monitors the submission of new adjudication instructions 112 and makes decisions on whether a re-adjudication is required. Re-adjudication trigger 110 communicates the re-adjudication decisions to a re-adjudication control module 111. Based on the new adjudication instructions 112, re-adjudication control 111 identifies one or more segments, measurement data streams and service levels, where each identified segment is a segment of an identified measurement data stream that needs to be re-adjudicated for an identified service level. Re-adjudication control 111 then coordinates with adjudication module 103 and evaluation module 107 to carry out a real-time re-adjudication and re-evaluation process for the affected service levels. The re-adjudication generates re-adjudicated measurement data. In one embodiment, the re-adjudication coordinated by re-adjudication control 111 is performed in parallel with the reception by system 100 of another piece of original measurement data input. The re-evaluation performed by evaluation module 107 utilizes the aforementioned re-adjudicated measurement data to evaluate a service level. The dashed arrows in FIG. 1 depict the coordination (i.e., control flow) between re-adjudication control 111 and modules 103 and 107.

The re-adjudication and re-evaluation process includes the following steps:

(1) examine the one or more new adjudication instructions 112 to identify the associated SLA(s), service level obligation(s), and measurement data stream(s), as well as the segment of the measurement data stream(s) that require re-adjudication;

(2) suspend the regular adjudication of the input measurement data stream(s) for the identified service obligations;

(3) queue the input measurement data stream(s) in a temporary store which can be implemented, for example, within adjudication module 103 or in other entities of system 100;

(4) retrieve the identified segment from the original measurement data or retrieve the corresponding segment of the most recently adjudicated measurement data if incremental adjudication is employed by system 100;

(5) apply one or more applicable adjudication instructions, including new adjudication instruction(s) 112, to the retrieved segment, or apply only the new adjudication instruction(s) 112 to the retrieved segment of the most recently adjudicated measurement data if incremental adjudication is employed by system 100;

(6) re-evaluate service level attainment(s) for the identified service level obligation(s) and use the re-evaluation results to update any intermediate evaluation results for the identified service level obligation(s); and (7) resume the regular processing associated with the identified service level obligation(s) by resuming adjudication of the queued input measurement data stream(s) in the temporary store (e.g., a buffer).

To support re-adjudication, original measurement data store 102 and adjudication instruction store 109 are implemented via persistent storage. To facilitate quick access of data during runtime, at least some of the original measurement data and/or adjudication instructions are copied to other types of storage (e.g., cache storage). Adjudicated measurement data 104 is, for example, stored in a cache memory, a local database, a flat file on a server, etc. to facilitate quick access to the adjudicated measurement data. In the exemplary embodiment depicted in FIG. 1, persistent storage of adjudicated measurement data 104 is necessary for supporting segmented re-adjudication, which is described below relative to FIGS. 4 and 7A-7B.

System 100 supports simultaneous processing of service level attainment evaluations of multiple service levels in a single SLA contract or in multiple SLA contracts. Further, system 100 supports a process of re-adjudication and re-evaluation that can be carried out in parallel for multiple independent service levels and multiple independent SLA contracts. Still further, system 100 supports service level attainment calculations based on related service levels. For example, a calculation of an attainment value for service level X may utilize as input a previously calculated attainment value of service level Y.

In one embodiment, system 100 integrates (1) one or more monitoring systems that produce real time measurement data input 101, (2) one or more adjudication modules 103, which apply SLA contract specific adjudication instructions to associated measurement data input, (3) one or more optional data transformation modules for data filtering or format transformation (see FIG. 2), (4) one or more evaluation modules 107 that calculate the service level over adjudicated measurement data per SLA contract-specified algorithms, and (5) a re-adjudication control module 111 which coordinates the re-adjudication and re-evaluation process triggered by a submission of one or more new adjudication instructions.

In one embodiment, system 100 supports shared measurement data input for evaluating multiple service levels of multiple SLA contracts. For example, system 100 supports a shared resource for the implementation of multiple services and/or for multiple customers.

In one embodiment, system 100 utilizes a store for adjudicated measurement data streams to support incremental adjudication of multiple adjudication instructions submitted at various times against the same segment of measurement data streams.

Figure 2:
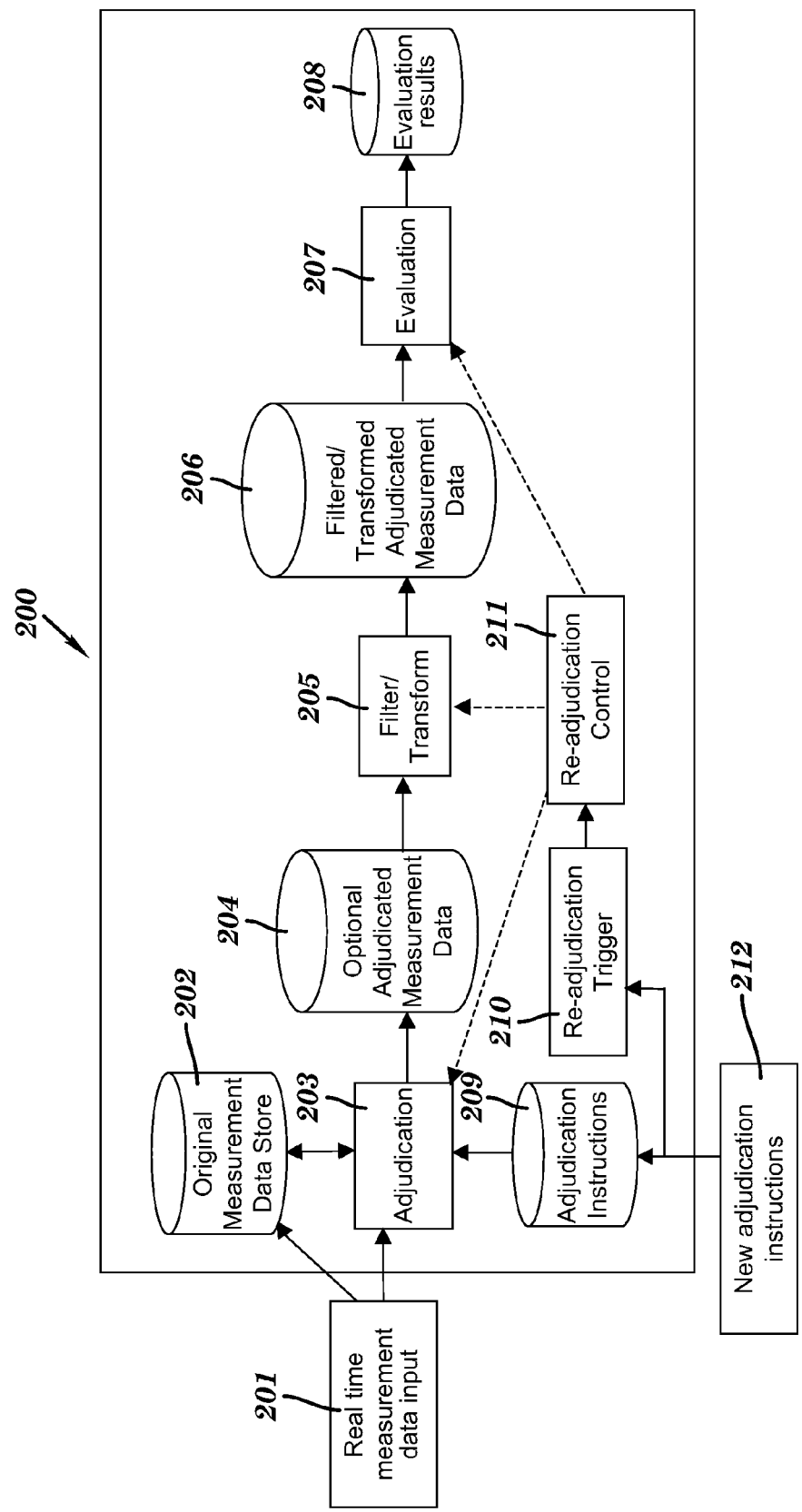
FIG. 2 is a block diagram of a second embodiment of a system for adjudicating measurement data and evaluating service levels in real time, where filtering and data transformation is applied to adjudicated measurement data streams, in accordance with embodiments of the present invention.

FIG. 2 is a block diagram of a second embodiment of a service level evaluation system 200 for adjudicating measurement data and evaluating service levels in real time, where filtering and data transformation is applied to adjudicated measurement data streams, in accordance with embodiments of the present invention.

Service level evaluation system 200 is a modification of system 100 (see FIG. 1), whereby additional functional blocks include a filter/transform module 205 and a filtered/transformed adjudicated measurement data store 206. In other embodiments, multiple filter modules and/or multiple transform modules are substituted for filter/transform module 205. The other blocks in FIG. 2 share the above-described functionalities of the similarly named blocks in FIG. 1.

In the embodiment of system 200, real time measurement data input 201 is sent from one or more monitoring systems to an original measurement data store 202 for re-adjudication and auditing, and to an adjudication module 203. In another embodiment, original measurement data store 202 is external to system 200 and is accessible by adjudication module 203.

Adjudication module 203 applies one or more adjudication instructions from adjudication instruction store 209 to the measurement data input to generate adjudicated measurement data, which is stored in adjudication measurement data store 204. The SLA contract-specific adjudicated measurement data 204 is filtered and/or transformed into corresponding filtered/transformed adjudicated measurement data 206 by filter/transform module 205, before being fed into evaluation module 207 to calculate the service level attainment in accordance with a SLA and to produce evaluation results 208. A filtering of adjudicated measurement data performed by module 205 removes redundant data. A transformation performed by module 205 is a change in the adjudicated measurement data's format or value. For example, a transformation provided by module 205 can modify the format of the original measurement data to another format (e.g., a change from data in an email format to a data format recognized by a database that stores filtered/transformed measurement data 206). The filtering performed by the filter/transform module 205 advantageously reduces the storage size requirement for adjudicated measurement data for certain types of measurement data streams (e.g., measurement data streams from periodic probing systems) and advantageously reduces the number of computation cycles for evaluation module 207.

New adjudication instructions 212 are submitted into an adjudication instructions store 209. Re-adjudication trigger 210 monitors the submission of new adjudication instructions 212 and determines if a re-adjudication is required. Re-adjudication trigger 210 communicates such a determination to re-adjudication control module 211. Re-adjudication control 211 determines, according to the new adjudication instructions, the measurement data stream segments that need to be re-adjudicated and the service levels associated with the segments that need to be re-adjudicated. Similar to FIG. 1, re-adjudication control 211 coordinates with adjudication module 203 and evaluation module 207 to carry out the required real time re-adjudication and re-evaluation of the associated service levels. The re-adjudication generates re-adjudicated measurement data. In one embodiment, the re-adjudication coordinated by re-adjudication control 211 is performed in parallel with the reception of another piece of original measurement data input at the system 200. The re-evaluation performed by the evaluation module 207 utilizes the re-adjudicated measurement data to evaluate a service level.

The re-adjudication and re-evaluation process in system 200 includes the following steps:

(1) examine the one or more new adjudication instructions 212 to identify the associated SLA(s), service level obligation(s), and input measurement data stream(s), as well as the segment of the measurement data stream(s) that require re-adjudication;

(2) suspend the regular adjudication of the input measurement data stream(s) for the identified service level obligation (s);

(3) queue the input measurement data stream(s) in a temporary store which can be implemented, for example, within adjudication module 203 or in other entities of system 200;

(4) retrieve the identified segment from the original measurement data or retrieve the corresponding segment of the most recently adjudicated measurement data if incremental adjudication is employed by system 200;

(5) apply one or more applicable adjudication instructions, including new adjudication instruction(s) 212, to the retrieved segment to generate an adjudicated segment, or apply only the new adjudication instruction(s) 212 to the retrieved segment of the most recently adjudicated measurement data to generate an adjudicated segment, if incremental adjudication is employed by system 200;

(6) filter, if applicable, the adjudicated segment produced by step (5) and update a corresponding segment in the filtered adjudicated measurement data associated with the identified service level obligation(s) in the identified SLA(s);

(7) re-evaluate service level attainment(s) for the identified service level obligation(s) and use the re-evaluation results to update any intermediate evaluation results for the identified service level obligation(s); and (8) resume the regular processing associated with the identified service level obligation(s) by resuming adjudication of the queued input measurement data stream(s) in the temporary store (e.g., a buffer).

In system 200, the store for adjudicated measurement data 204 is optional. If store 204 is not present in system 200, adjudicated measurement data generated by adjudication module 203 is sent directly to filter/transform module 205 for filtering or transforming as described above. The storage of the filtered/transformed adjudicated measurement data 206 is, however, necessary for supporting segmented re-adjudication which is described below relative to FIGS. 5 and 7A-7B.

Figure 3A:
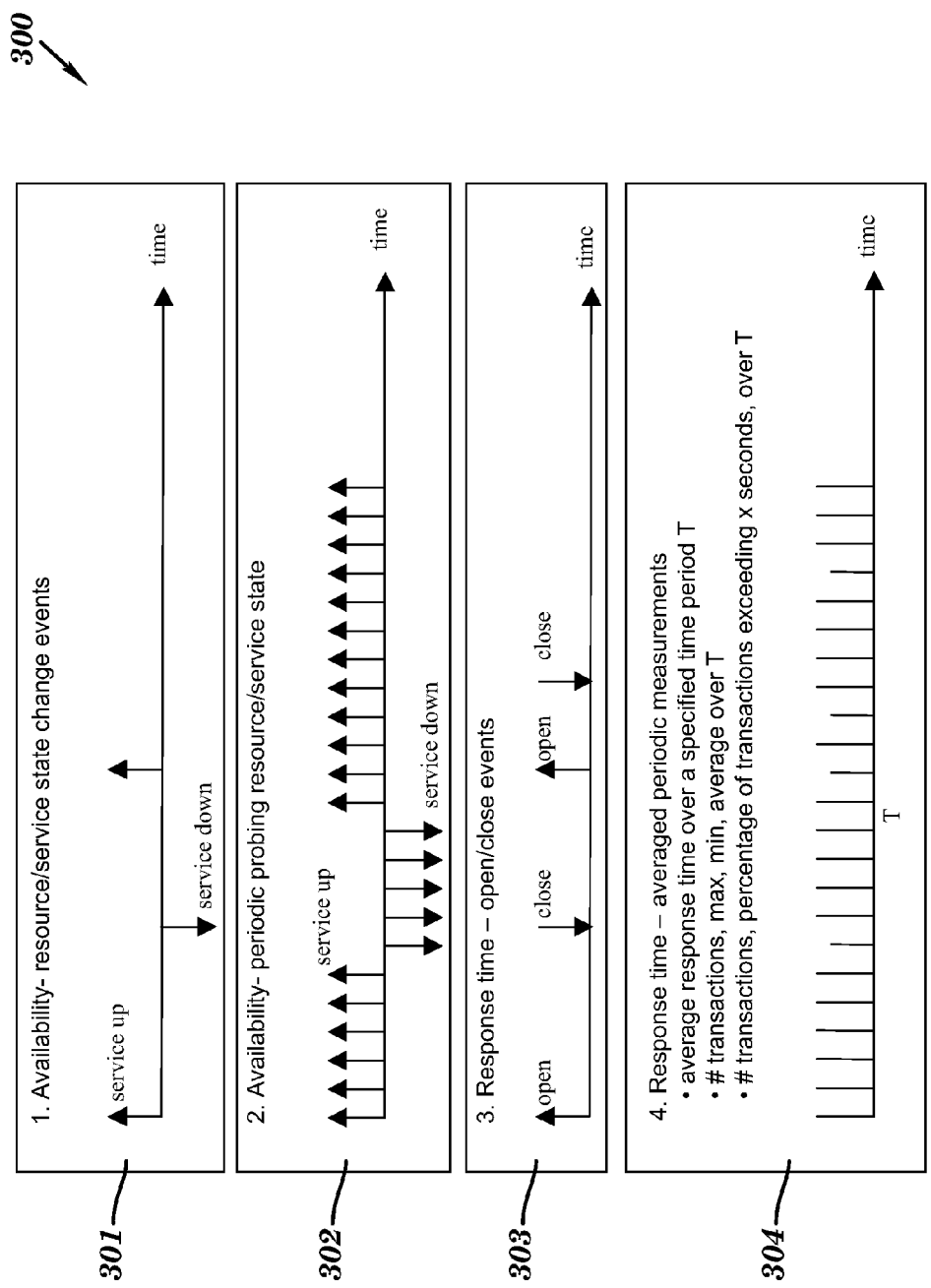
FIG. 3A depicts examples of measurement data types utilized in the systems of FIG. 1 and FIG. 2, in accordance with embodiments of the present invention.

FIG. 3A depicts examples of types of original measurement data utilized in the systems of FIG. 1 and FIG. 2, in accordance with embodiments of the present invention. The types of measurement data input depicted in FIG. 3A are:

1. Availability based on state change event messages 301, which includes a sequence of events indicating state changes of a service/resource (e.g. indications of when a service that had been down comes up and when a service that had been up goes down);

2. Availability based on periodic state probing 302, which includes a sequence of periodic probing results (e.g. every 5 minutes) indicating the state (e.g., down or up) of a service/resource;

3. Response (transaction) time based on status change events of individual transactions 303, which includes a sequence of events indicating transaction start (e.g., open) and end (e.g., close) times; and 4. Averaged or aggregated periodic measurement data 304 for response times or transactions, which include a periodic sequence of averaged or aggregated measurement data over a period of time (e.g., average response time over time period T, number of transactions over time period T, percentage of transactions exceeding x seconds over time period T, etc.). The differing heights of the measurement data items 304 indicate, for example, the value of the response time or number of transactions (e.g., a shorter line segment indicates a faster response time or a fewer number of transactions).

Figure 3B:
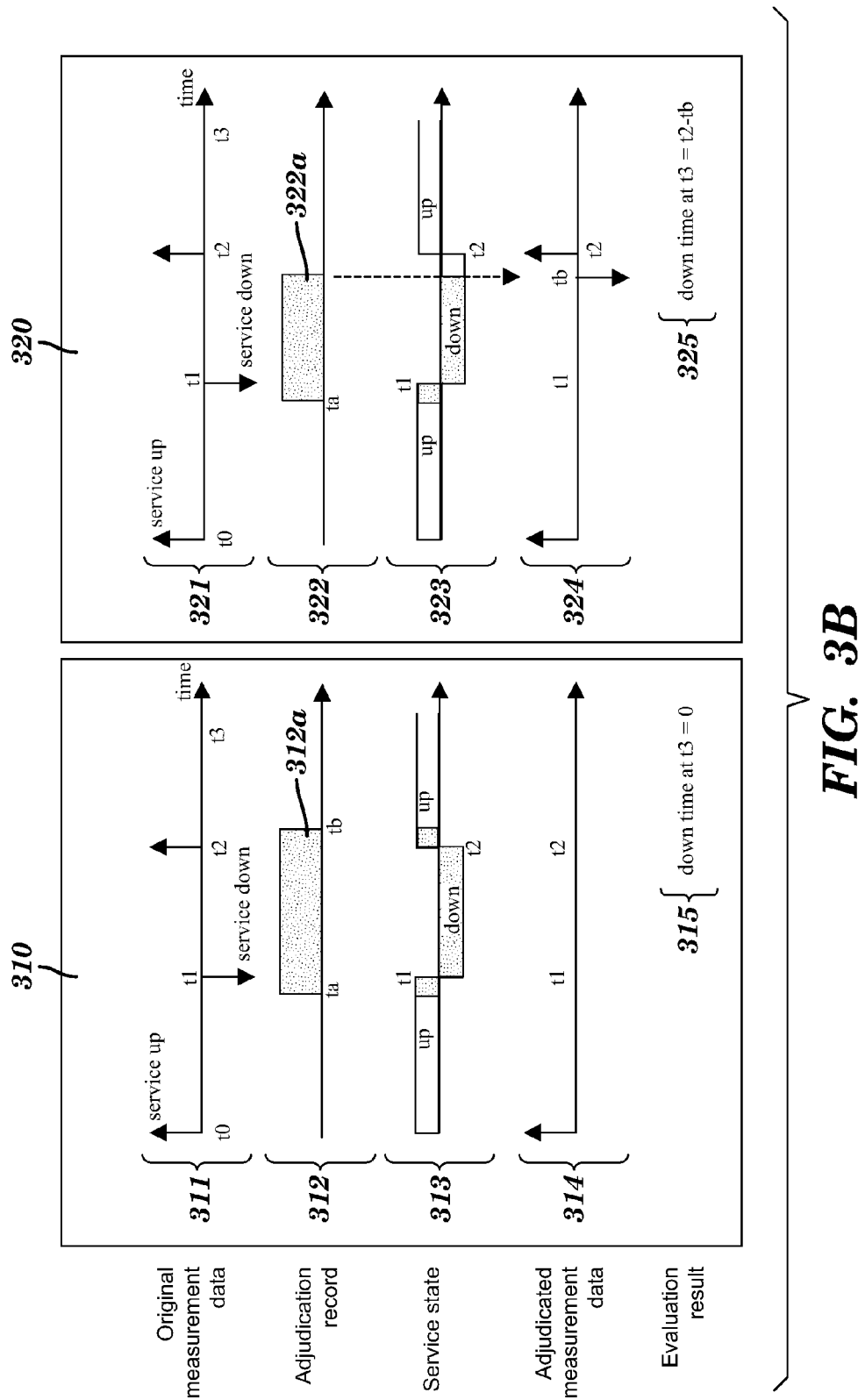
FIGS. 3B-3C depict examples of a real time adjudication process provided by the system of FIG. 1 or FIG. 2 and using a state change availability measurement data stream of FIG. 3A, in accordance with embodiments of the present invention.
Figure 3C:
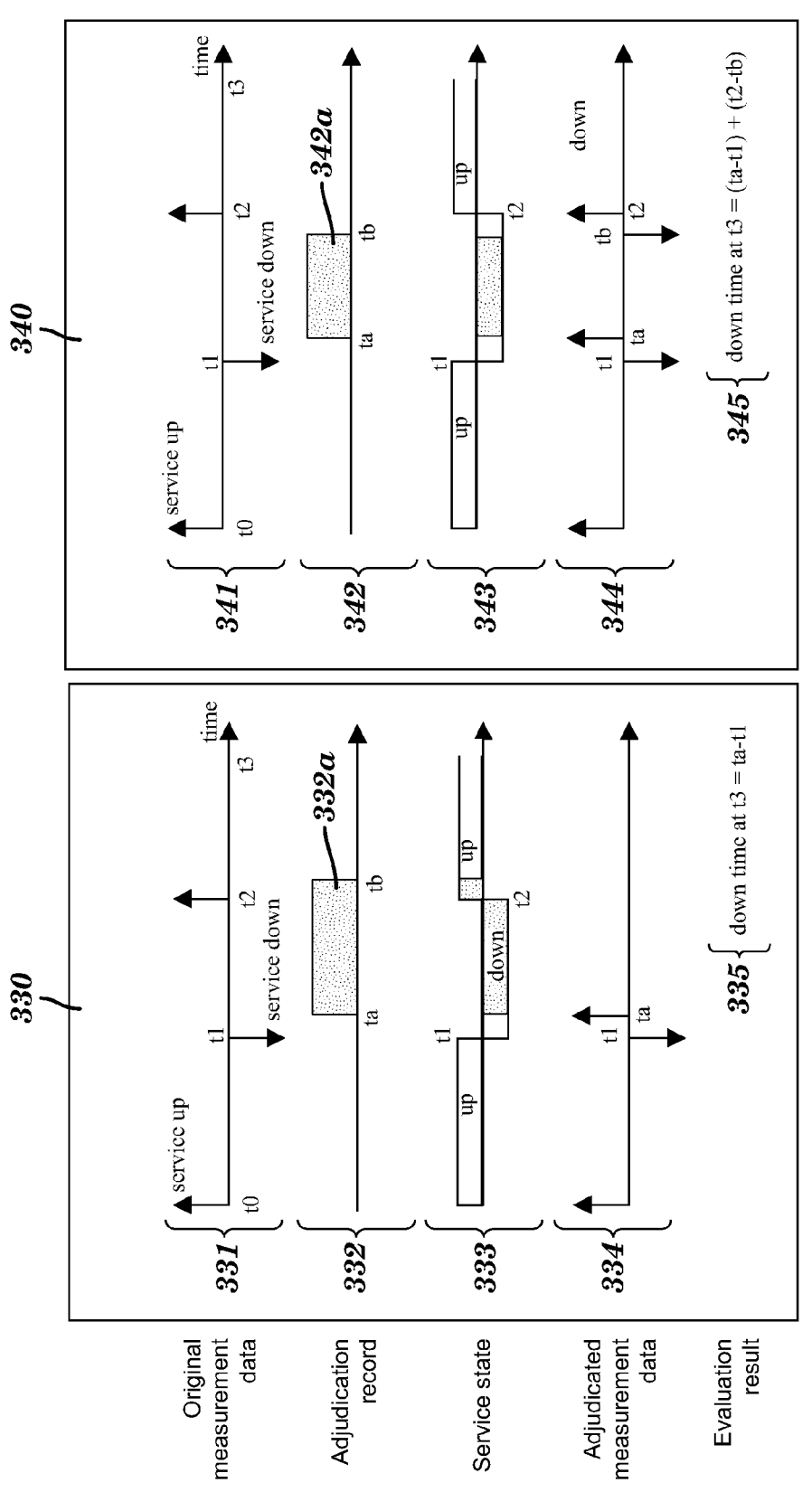

FIGS. 3B-3C depict examples of a real time adjudication process provided by the system of FIG. 1 or FIG. 2 and using a state change availability measurement data stream 301 of FIG. 3A, in accordance with embodiments of the present invention. FIG. 3B includes time sequences 310 and 320. FIG. 3C includes time sequences 330 and 340. Each of these four sets of time sequences 310, 320, 330, 340 include five sets of data: (1) an original measurement data sequence, (2) an adjudication record showing an exclusion period, (3) a service state sequence, (4) an adjudicated measurement data stream, and (5) an evaluation result.

Time sequences 310 are a snapshot of the system data at time t3 after a service down occurred and after an adjudication by an exclusion adjudication record. This scenario represents a scheduled service maintenance activity. The aforementioned sets of data (1) through (5) relative to time sequence 310 are 311, 312, 313, 314 and 315, respectively. Time t0 is the beginning of the current service evaluation period. The service down occurred during time t1 to t2 in the evaluation period (see original measurement data 311). The adjudication records 312 includes an exclusion period 312a from ta to tb which completely covers the service down period t1 to t2 (i.e., ta is prior to t1 and tb is subsequent to t2). As a result of this exclusion period, the service state is shown in service state sequence 313 where the shaded period is to be excluded from service level evaluation. The measurement data indicated by the arrows at t1 and t2 in sequence 311 are excluded by exclusion period 312a, and therefore those arrows are not shown in sequence 314. The adjudicated measurement data stream is depicted in sequence 314. As shown in evaluation result 315, the cumulative down time at time t3 is 0 since the down time is completely excluded from the service level calculation by the exclusion period 312a.

The time sequences 320, 330 (see FIG. 3C), and 340 (see FIG. 3C) depict the same scenario as 310 except their respective exclusion periods ta to tb only partially cover the associated service down period t1 to t2.

Relative to time sequences 320, the aforementioned sets of data (1) through (5) are 321, 322, 323, 324 and 325, respectively. In time sequences 320, the service state 323 is still down when the exclusion period 322a ends. As a result of this type of partial coverage of the down time by the exclusion period, a piece of adjudication measurement data is inserted at tb, as shown by the arrow at tb in sequence 324. As shown in evaluation result 325, the cumulative down time at time t3 is t2−tb (i.e., the down time from tb to t2 is not covered by exclusion period 322a). As an example which can be represented by this scenario, exclusion period 322a is determined in an SLA-governed resolution of a dispute between a service provider and a customer who requests the computing service. In this example, the dispute resolution determined that the customer made changes to a web site that caused a web service to go down, and therefore any service down time during exclusion period 322a is the fault of the customer (i.e., the down time from t1 to tb). As the t1 to tb down time is the customer's fault, the down time measurement data during t1 to tb is excluded from service level calculations that determine if an SLA-specified target service level is met or surpassed. Further, the dispute resolution determined that the service down time from tb to t2 is the service provider's fault and thus, the tb to t2 down time 325 is included in SLA-specified service level calculations.

Relative to time sequences 330 of FIG. 3C, the aforementioned sets of data (1) through (5) are 331, 332, 333, 334 and 335, respectively. In time sequences 330, the service state 333 becomes down at t1, which is before exclusion period 332a starts at ta, and comes up at t2, which is before exclusion period 332a ends at tb. As a result of this type of partial coverage of the down time by the exclusion period, a piece of adjudication measurement data is inserted at ta (see sequence 334) because the start of the exclusion period is subsequent to t1. As shown in evaluation result 335, the cumulative down time at time t3 is ta−t1 (i.e., the down time from t1 to ta is not covered by the exclusion period 332a).

Relative to time sequences 340 of FIG. 3C, the aforementioned sets of data (1) through (5) are 341, 342, 343, 344 and 345, respectively. In time sequences 340, the service state 343 becomes down at t1, which is before exclusion period 342a starts at ta, and comes up at t2, which is after exclusion period 342a ends at tb. An adjudication measurement data is inserted at ta (see arrow at ta in sequence 344) because the start of exclusion period 342a is subsequent to t1. Another piece of adjudication measurement data is inserted at tb (see arrow at tb in sequence 344) because the end of exclusion period 342a is prior to t2. As shown in evaluation result 345, the cumulative down time at time t3 is (ta−t1)+(t2−tb) (i.e., the down time from t1 to ta and the down time from tb to t2 are not covered by exclusion period 342a).

To summarize, for state change availability measurement data, exclusion adjudication requires insertion of adjudicated measurement data points at the start time and end time of the exclusion period if the service state is down at the exclusion period start and end times (see sequence 344 of FIG. 3C). An "up" adjudicated measurement data point is inserted in the case where the service state is down upon entering an exclusion period (see, e.g., the insertion of the arrow at ta in sequence 334 or sequence 344 of FIG. 3C). A "down" adjudicated measurement data point is inserted in the case where the service state is down upon exiting an exclusion period (see the insertion of the arrow at tb in sequence 324 of FIG. 3B or sequence 344 of FIG. 3C).

The exclusion adjudication method discussed above relative to FIGS. 3B-3C also applies to the periodic probing measurement data stream 302 of FIG. 3A.

Figure 4:
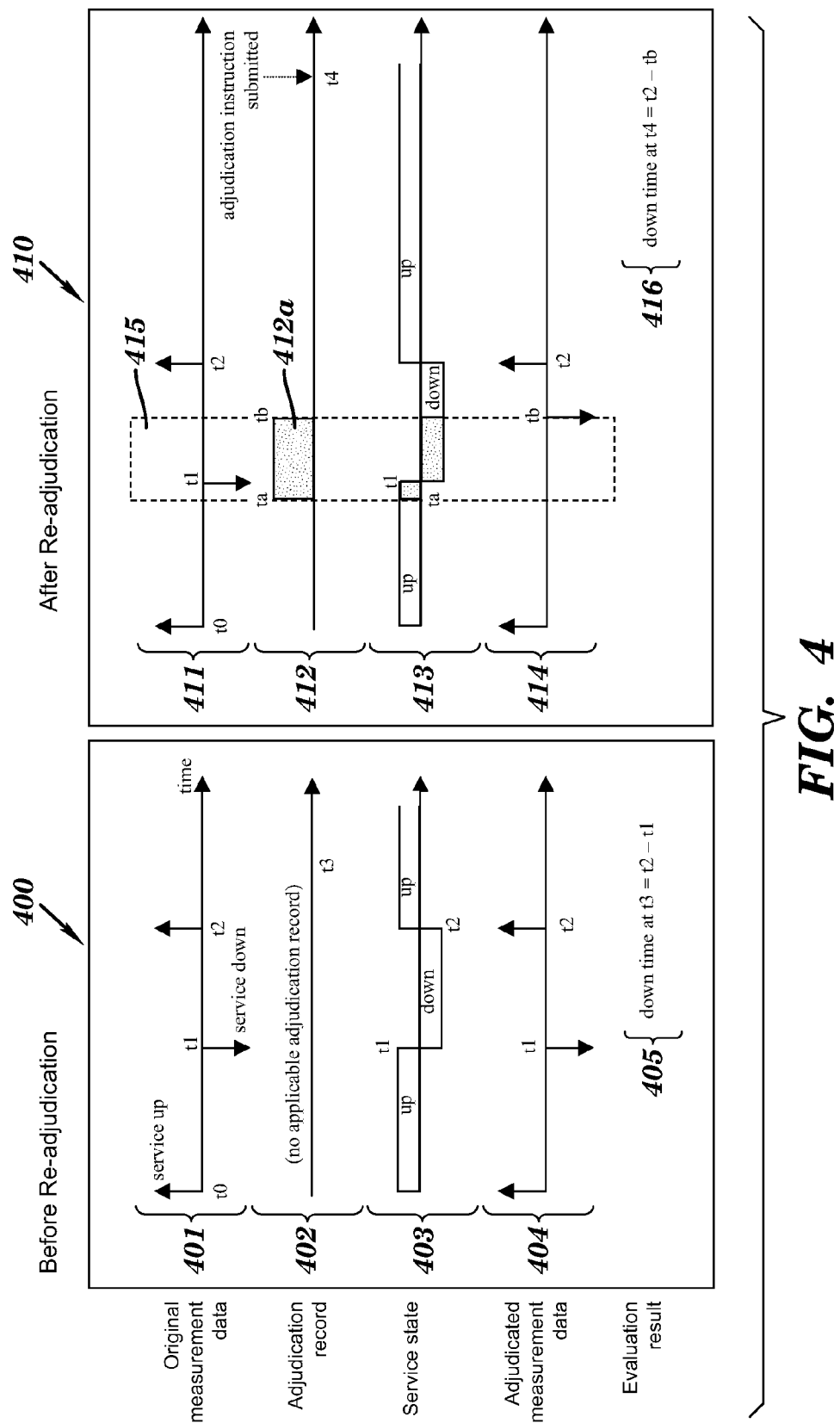
FIG. 4 depicts an example of a real time re-adjudication process for state change availability measurement data streams input into the system of FIG. 1 or FIG. 2, in accordance with embodiments of the present invention.

FIG. 4 depicts an example of a real time re-adjudication process for state change availability measurement data streams input into the system of FIG. 1 or FIG. 2, in accordance with embodiments of the present invention. The present invention employs a method of segmented re-adjudication that first precisely identifies the segments of the original measurement data stream 101 (see FIG. 1) or 201 (see FIG. 2) that need be re-adjudicated, instead of re-adjudicating the complete set of measurement data for the evaluation period. The segmented re-adjudication suspends the regular evaluation process and places the continuously incoming measurement data stream into a temporary queue. The identified segments of the original measurement data are re-adjudicated and filtered if necessary. New corresponding adjudicated and filtered measurement data are generated to replace the previously generated data in the segment. After the completion of re-adjudication and other system updates that may be necessary, the regular adjudication and evaluation process resumes with the queued input measurement data being adjudicated and evaluated to produce up-to-date and accurate evaluation results.

FIG. 4 illustrates example time sequences of a real time re-adjudication process provided by system 100 (see FIG. 1) for state change availability measurement data stream 301 (see FIG. 3A). Time sequences 400 are a snapshot of the system data at time t3 before re-adjudication is triggered. Time sequences 400 include a sequence of original measurement data 401, a sequence showing an absence of applicable adjudication records 402, a sequence of service states 403, an adjudicated measurement data stream 404, and an evaluation result 405.

Time sequences 410 are a snapshot of the system data at time t4 after a re-adjudication has been conducted. Time sequences 410 include a sequence of original measurement data 411, a sequence showing any adjudication instruction submissions 412, a sequence of service states 413, an adjudicated measurement data stream 414, and an evaluation result 416. Sequence 412 also includes an exclusion period 412a.

Time t0 in time sequences 400 and 410 is the beginning of the current service evaluation period. The time sequences 400, 410 illustrate a scenario where a service outage occurred during time t1 to t2 (see, e.g., original measurement data 401) in the evaluation period. At time t3, there were no adjudication instructions in the system (see adjudication record sequence 402) and the service down event at t1 was counted as a valid outage against the service level (see adjudicated measurement data sequence 404). The cumulative down time result 405 at time t3 is t2−t1. In this scenario, it is determined later that the outage was caused partially by the fault of the customer. A portion of the outage from time ta to time tb (i.e., exclusion period 412a, which begins at time ta and ends at time tb) needs to be excluded from the service level evaluation according to the SLA contract. An adjudication instruction is therefore created and submitted to system 100 (see FIG. 1) at time t4, as shown in sequence 412. In response to the new adjudication instruction submission, the re-adjudication process of system 100 (see FIG. 1) identifies a segment 415 of the measurement data stream that needs to be re-adjudicated, re-adjudicates the segment by applying the new adjudication instruction to the measurement data of segment 415, updates the corresponding segment of the adjudicated measurement data 414, and updates the service level evaluation result 416 via re-evaluation so that the cumulative down time is changed from t2−t1 (see result 405) to t2−tb. The aforementioned corresponding segment of adjudicated measurement data is a portion of adjudicated measurement data generated by adjudicating the measurement data of segment 415 using the process of FIGS. 6A-6B. As this re-adjudication process identifies measurement data segment 415 and updates the corresponding segment of the adjudicated measurement data, the process is also known as segmented re-adjudication.

It should be noted that segmented re-adjudication for exclusion requires the information of the service state at the time ta in sequence 413 prior to the start of the exclusion period. The re-adjudication process provided by system 100 (see FIG. 1) inserts a new adjudicated measurement data point "adjudicated up" at ta if the service state is down prior to the start of the exclusion period (see FIG. 3C). The service state at ta can be retrieved from the last (i.e., most recent) adjudicated data point prior to the exclusion period. It is also noted that segmented re-adjudication updates only the corresponding segment of the adjudicated measurement data. It requires storage of the adjudicated measurement data stream in order to update the evaluation results upon re-adjudication.

Figure 5:
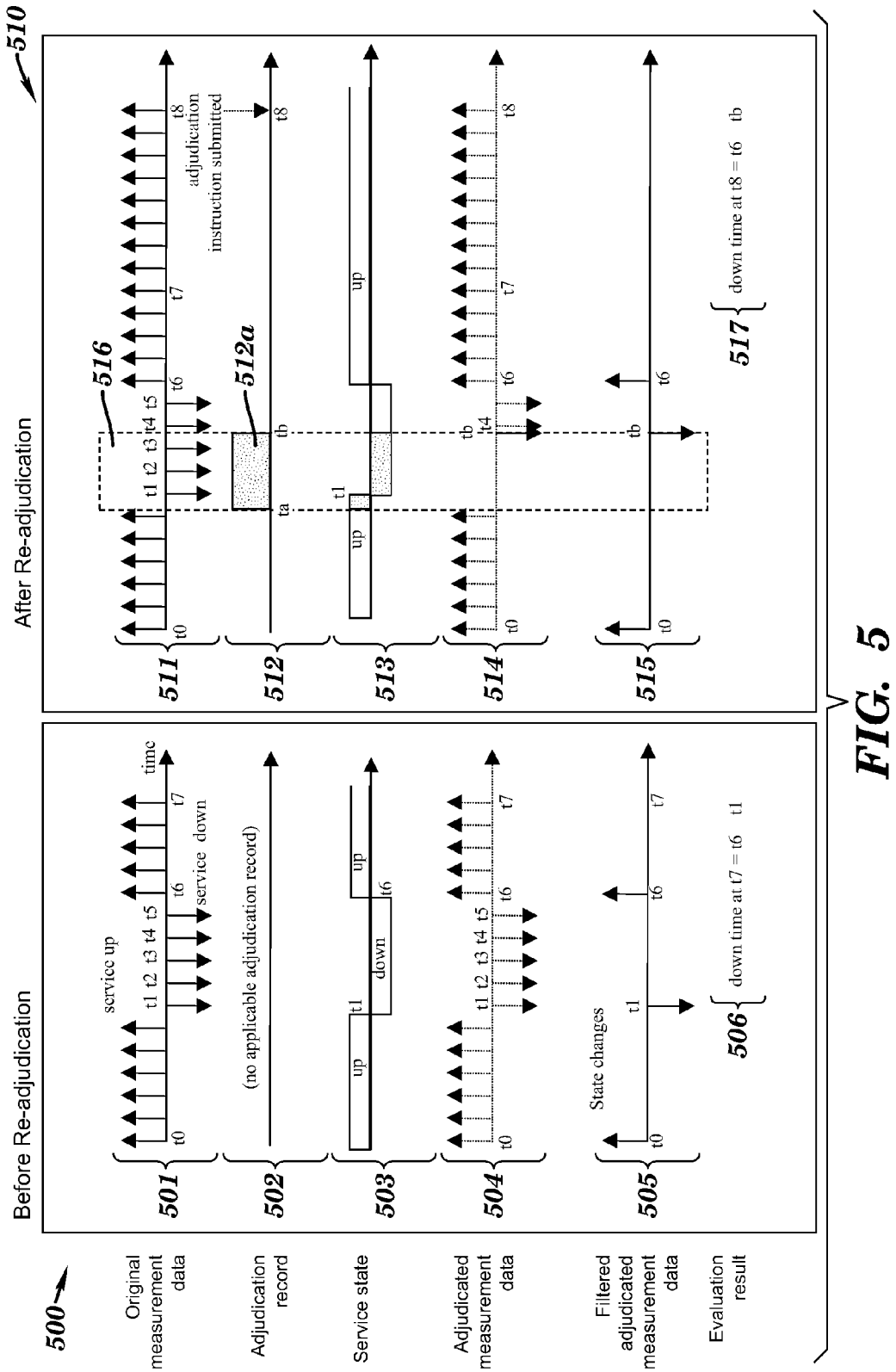
FIG. 5 depicts an example of a real time re-adjudication process for availability measurement steams of periodic probing where measurement data filtering is employed in the system of FIG. 2, in accordance with embodiments of the present invention.

FIG. 5 depicts an example of a real time re-adjudication process for the availability measurement steams of periodic probing where measurement data filtering is employed in the system of FIG. 2, in accordance with embodiments of the present invention. The re-adjudication process of FIG. 5 is applied to the availability measurement stream of periodic probing 302 (see FIG. 3A), where filtering is employed to reduce storage and computation.

Time sequences 500 are a snapshot of the system data at time t7 before re-adjudication is triggered. Time sequences 500 include a sequence of original measurement data 501, an indication of the absence of applicable adjudication records 502, a sequence of service states 503, an adjudicated measurement data stream 504, a filtered adjudicated measurement data stream showing state transition data 505, and a down time evaluation result 506.

Time sequences 510 are a snapshot at time t8 after a re-adjudication has been conducted. Time sequences 510 include a sequence of original measurement data 511, a sequence showing a submission of an applicable adjudication instruction 512, a sequence of service states 513, an adjudicated measurement data stream 514, a filtered adjudicated measurement data stream showing state transition data 515, and a down time evaluation result 517. Sequence 512 also includes an exclusion period 512a.

Time t0 is the beginning of the current service evaluation period. The example of FIG. 5 illustrates a scenario where a service down period occurred during time t1 to t6 in the evaluation period as shown in the original measurement data stream 501. System 200 (see FIG. 2) produces the adjudicated measurement stream 504 as there are no adjudication instructions 502 in the system up to time t7 and therefore the service down during t1 to t6 was considered a valid outage against the service level. System 200 (see FIG. 2) filters adjudicated measurement data 504 to remove redundant data. The resultant state transition data 505 is then stored in filtered/transformed adjudicated measurement data store 206 (see FIG. 2) and used to calculate the cumulative down time 506 which is t6−t1 at time t7. It is noted that the dotted lines of adjudicated measurement data 504 indicate that, in one embodiment, the adjudicated measurement data is not be stored after the corresponding filtered adjudication measurement data is produced.

At a later time t8 (i.e., t8 is after time t7), as depicted in time sequences 510, system 200 determines that the down time t1 to t6 includes a portion that is due to some exemptible causes (e.g., the fault of the customer and not the service provider). The down time portion due to exemptible causes that is also within the exclusion period from time ta to time tb is excluded from the service level attainment calculation according to the SLA contract. An adjudication instruction shown in sequence 512 is therefore created and submitted into system 200 (see FIG. 2) at time t8. In response to the adjudication instruction submission 512, system 200 (see FIG. 2) identifies the measurement data segment that needs to be re-adjudicated and re-filtered to update the filtered adjudicated measurement data. In the scenario shown by sequences 510, exclusion period 512a determines the minimum re-adjudication and re-filtering segment 516.

It is again noted, as discussed above relative to FIGS. 3B-3C, that the information of the service state at ta is required for appropriate re-adjudication. The service state at ta can be retrieved from the last (i.e., most recent) data point of the filtered adjudicated measurement data 515 before the start of exclusion period 512a. As the result of re-adjudication, the measurement data at t1, t2, and t3 (see original measurement data stream 511) are excluded and a new adjudicated measurement data point is inserted at tb in adjudicated measurement data stream 514, as the service state remains down when the exclusion period ends. After the filtered adjudicated measurement data is updated to indicate state transition data 515, the cumulated down time 517 at time t8 is re-evaluated to be t6−tb.

The determination of the segment in the segmented re-adjudication process must take into account the following factors:

(1) measurement data type (see FIG. 3A);
(2) schemes used in filter/transform module 205 (see FIG. 2); and
(3) availability of previously adjudicated measurement data. In one embodiment, to save storage space, the previously adjudicated measurement data is not stored. In this case, a re-adjudication segment larger that what the re-adjudication instruction indicates may be required to reproduce a portion of the adjudicated measurement data stream for appropriate filtering (i.e., a re-adjudication and filtering segment is enlarged beyond one or both of the boundaries set by the exclusion period 512a). For example, if system 200 (see FIG. 2) employs filtering that averages X data points over a time window to produce one filtered data point and if the re-adjudication segment includes less than X data points, then a re-adjudication and filtering segment must be greater than the re-adjudication segment to include at least X data points.

Real Time Adjudication Process

Figure 6A:
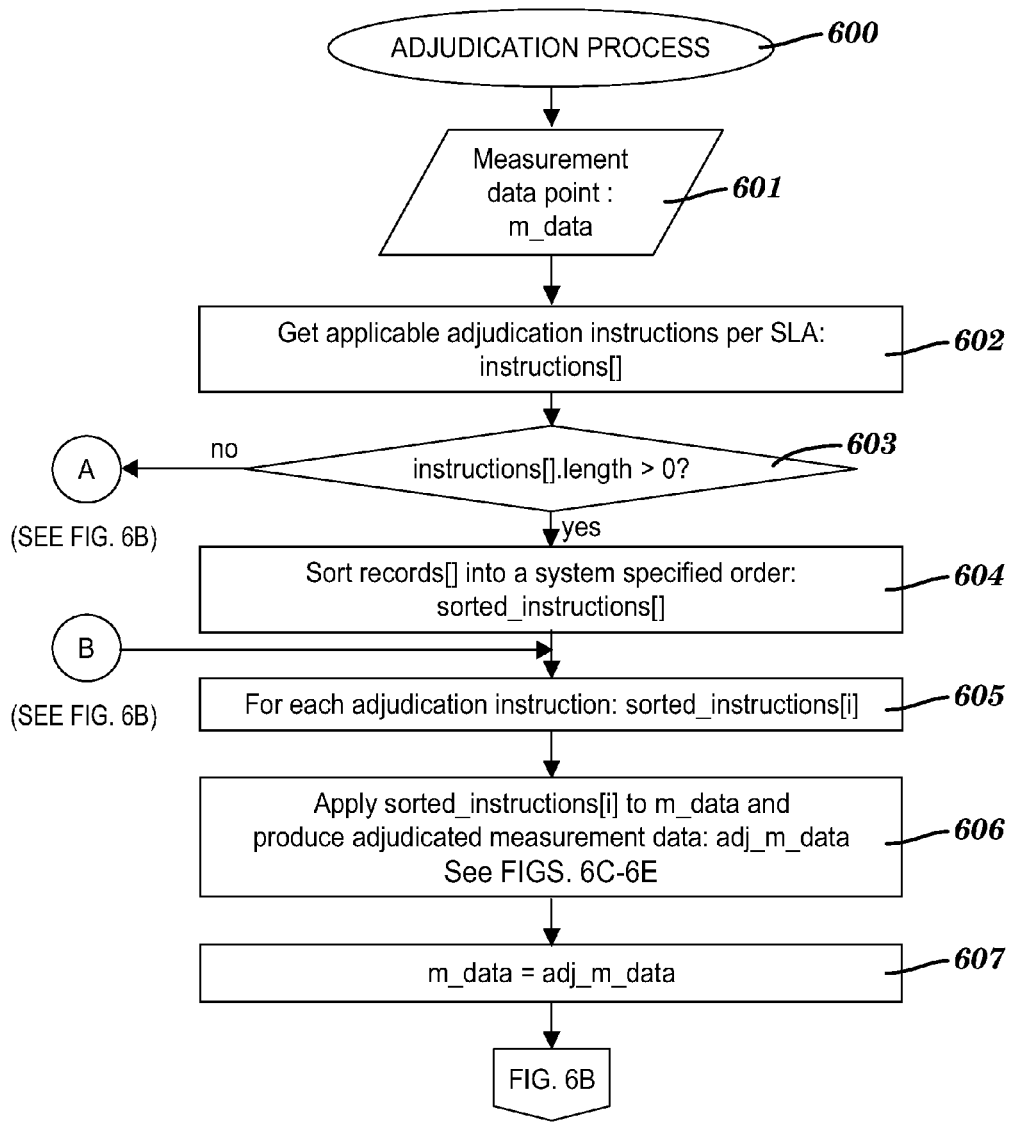
FIGS. 6A-6B depict a flow diagram of a process of adjudicating measurement data streams in real time in the system of FIG. 1 or FIG. 2, in accordance with embodiments of the present invention.
Figure 6B:
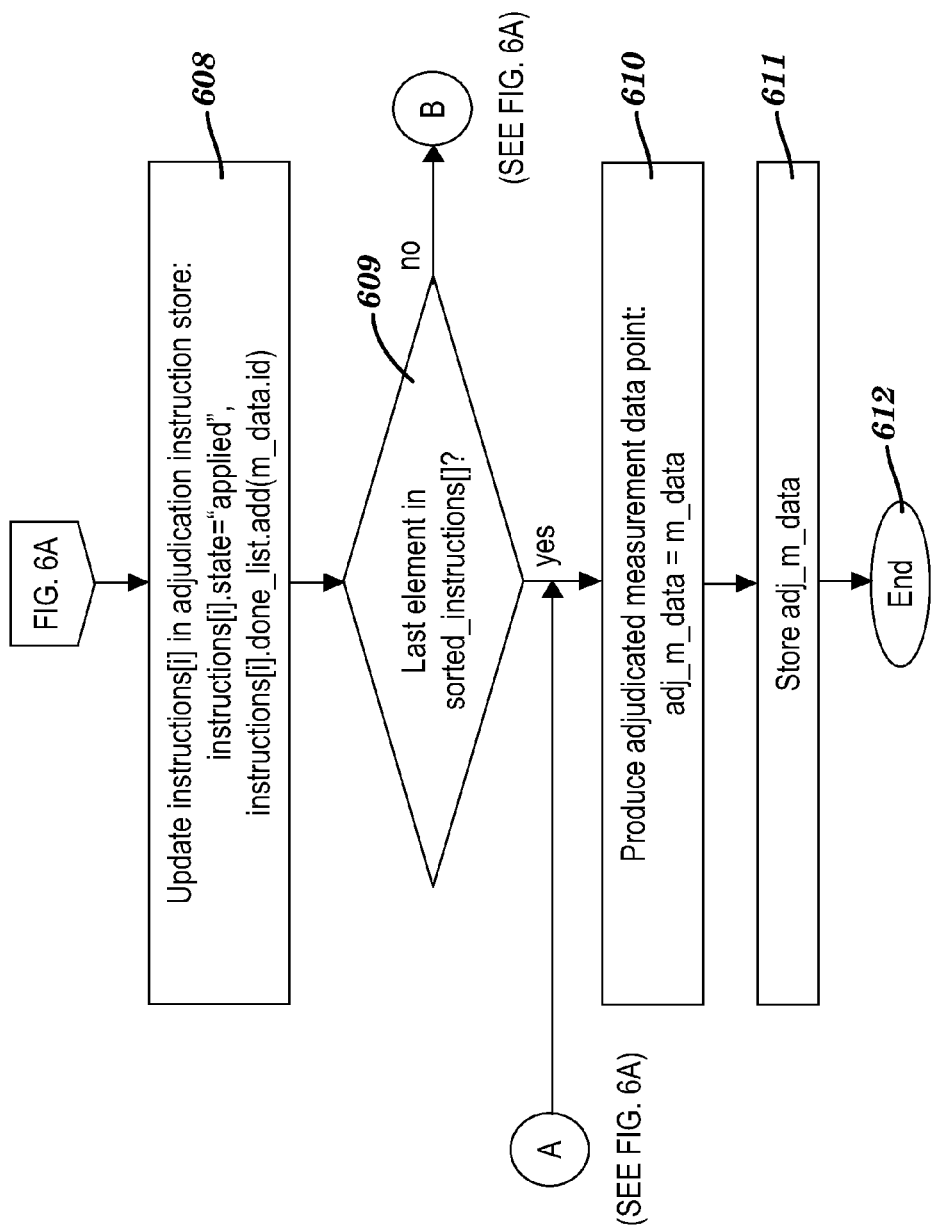

FIGS. 6A-6B depict a flow diagram of a process of adjudicating measurement data streams in real time in the system of FIG. 1 or FIG. 2, in accordance with embodiments of the present invention. The process for adjudicating measurement data in real time per SLA contract is implemented by adjudication module 103 (see FIG. 1) or 203 (see FIG. 2) and begins at step 600. The process of FIGS. 6A-6B demonstrates a real time measurement data adjudication process for a single service level in a SLA contract. In other embodiments, multiple instances of the process of FIGS. 6A-6B may run simultaneously (e.g., in a case where a measurement data stream is associated with multiple service levels of different SLA contracts). The process of FIGS. 6A-6B starts with a new input measurement data point "m_data" 601 being fed into the system. Step 602 retrieves applicable adjudication instructions per service level and per SLA contract from adjudication instruction store 109 (see FIG. 1) or 209 (see FIG. 2). If inquiry step 603 determines that one or more applicable adjudication instructions were retrieved in step 602, then the retrieved adjudication instructions are sorted into an array in step 604 in a system-specified order. The system-specified order determines the sequence in which the instructions are to be applied to the measurement data point.

Step 605 starts a loop performed for each adjudication instruction in the sorted order. The loop includes steps 606 through 609. In step 606 the adjudication instruction is applied to the measurement data point m_data and the adjudicated measurement data point adj_m_data is produced. One embodiment of the application of the adjudication instruction in step 606 is described below relative to FIGS. 6C-6E. In step 607, adj_m_data is assigned to m_data so that m_data holds the current adjudicated result.

Following step 607, the real time adjudication process continues in FIG. 6B. Step 608 of FIG. 6B records the status of the adjudication instruction by updating the state of the adjudication instruction and adding the measurement data identifier to the adjudication instruction's "done" list. The state update in step 608 (e.g., assigning "applied" to the state of the adjudication instruction) indicates that the adjudication instruction has been applied to the measurement data point currently being processed. Adding the measurement data identifier to the "done" list in step 608 indicates that the processing of the new measurement data point from step 601 is complete. Step 609 checks if the current adjudication instruction is the last adjudication instruction in the array. If the answer to inquiry step 609 is yes, then step 610 produces a final adjudication measurement data point in adj_m_data, step 611 stores the final adjudication measurement data point in adjudicated measurement data store 104 (see FIG. 1) or 204 (see FIG. 2), and the process ends at step 612.

If the answer to the inquiry in step 609 is no, then the process starts the next iteration of the step 605 loop with the execution of the next adjudication instruction in the sorted order.

If the answer to inquiry step 603 is no, then step 610 generates the adjudicated measurement data point to be the same as the original measurement data input in step 601. The adjudicated measurement data point generated in step 610 is then stored in adjudicated measurement data store 104 (see FIG. 1) or 204 (see FIG. 2) in step 611 for use in calculation of the service level. Step 612 ends the adjudication process for the measurement data point of step 601.

The adjudication process of FIGS. 6A-6B is a real time process, and therefore one or more of the steps of FIGS. 6A-6B are performed in parallel with the reception of another piece of measurement data input at system 100 (see FIG. 1) or 200 (see FIG. 2).

Figure 6C:
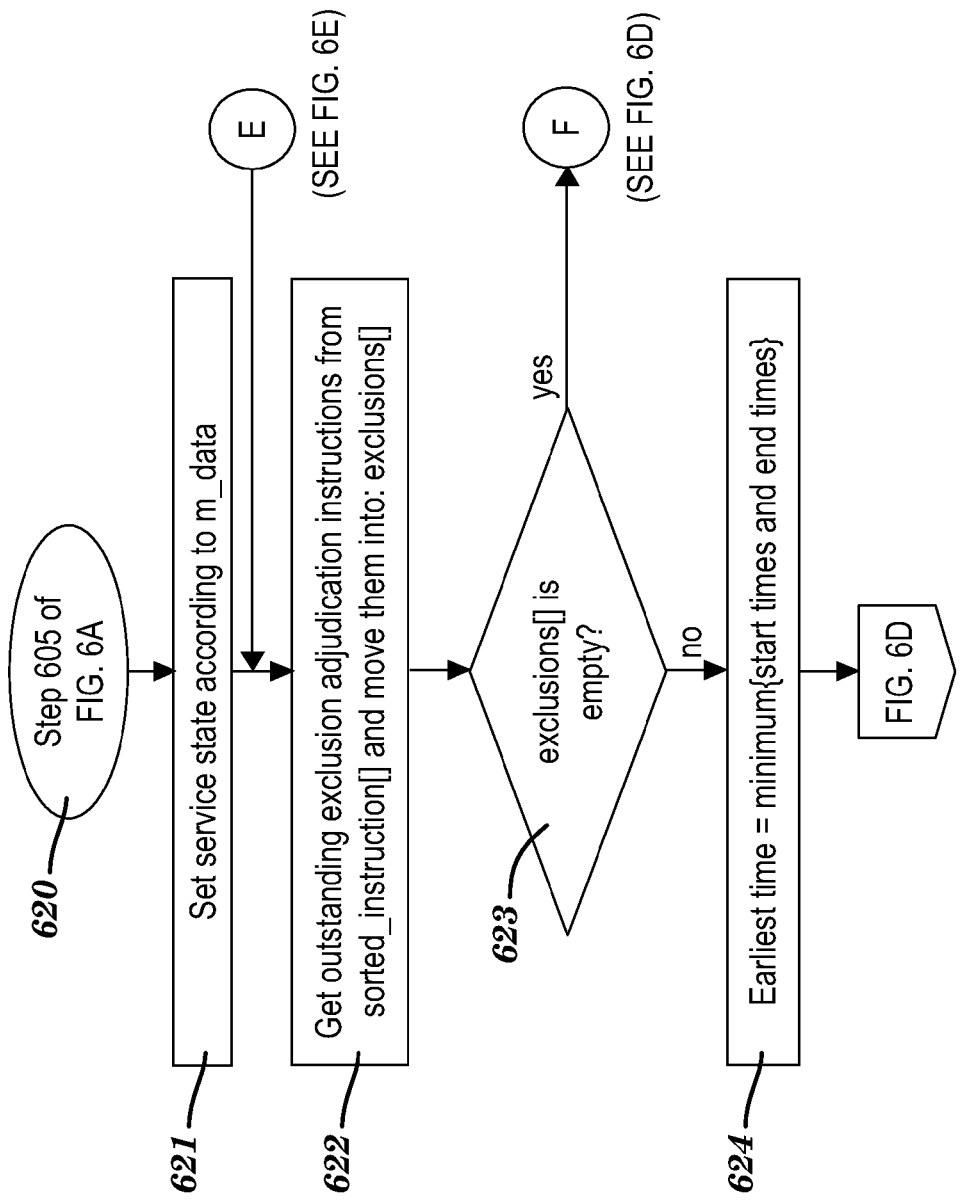
Figure 6D:
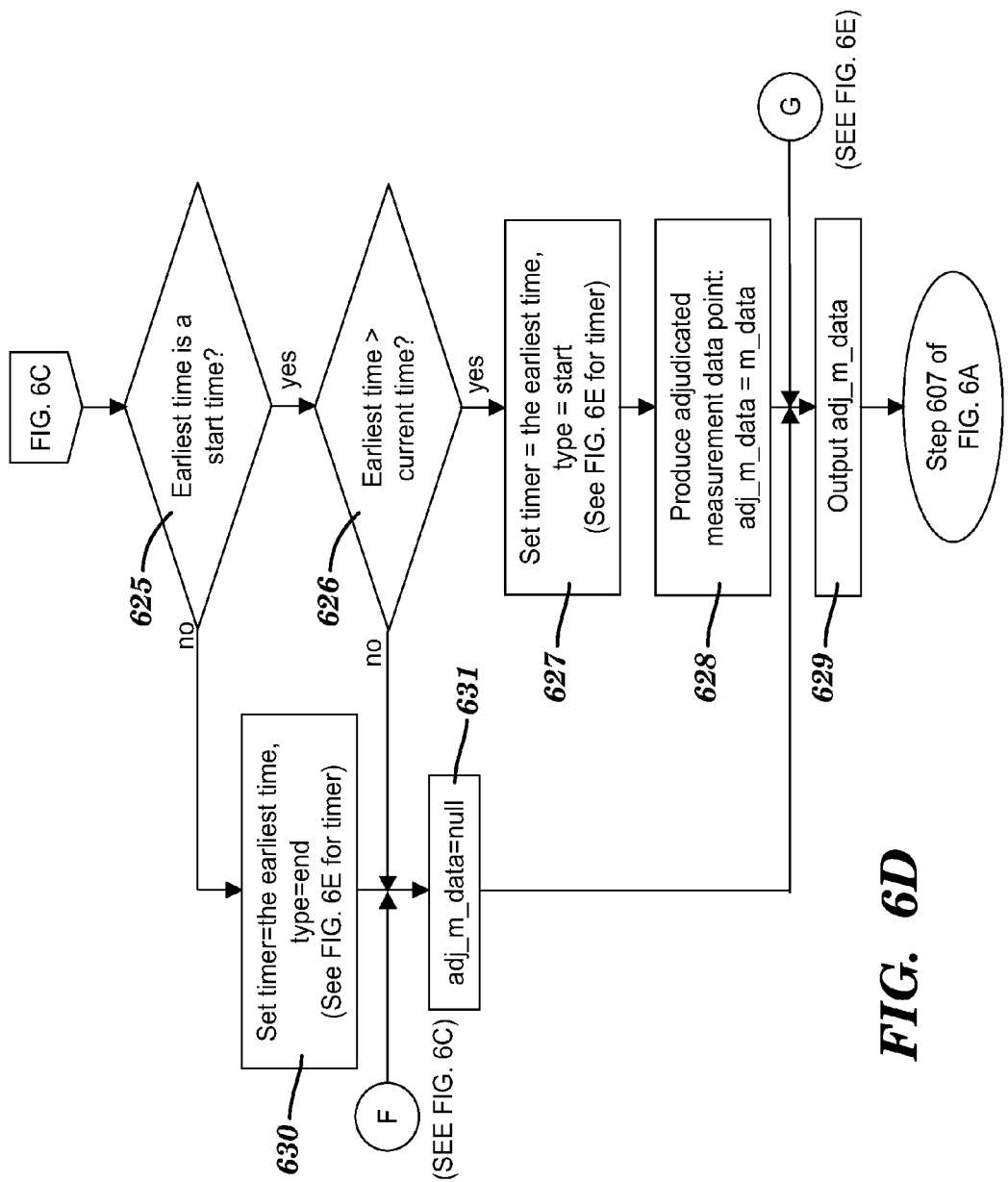

FIGS. 6C-6E depict a flow diagram of a process for applying individual exclusion adjudication instructions to an availability measurement stream in real time, which produces adjudicated measurement data within the process of FIGS. 6A-6B, in accordance with embodiments of the present invention. Step 606 in FIG. 6A may employ various embodiments to carry out the individual adjudication instructions of different types such as exclusion, modification, or insertion. One embodiment of step 606 (see FIG. 6A) is illustrated by FIGS. 6C-6E.

Step 620 indicates that the rest of the process of FIGS. 6C-6E follows step 605 of FIG. 6A. Step 621 sets the service state according to the current measurement data point. In one embodiment, the service state is set in step 621 by retrieving the service state from the last (i.e., most recent) adjudicated data point prior to the exclusion period (see, e.g., the retrieval of the service state at to in the discussion of FIG. 4 presented above). Step 622 moves all the outstanding exclusion adjudication instructions from the sorted_instruction array into a separate instruction array, which is herein referred to as exclusions[ ]. If inquiry step 623 determines that the exclusions[ ] array is empty, then a null adjudicated measurement data point is assigned in step 631 and outputted in step 629, and the process continues with step 607 of FIG. 6A. If inquiry step 623 determines that the exclusions[ ] array is not empty, step 624 sets the earliest time to be the earliest time among the start times and end times of the outstanding exclusion periods and the process continues in FIG. 6D.

If inquiry step 625 determines that the earliest time is the start time of an outstanding exclusion period and inquiry step 626 determines that the earliest time is greater than the current time, then the current measurement data point is prior to the exclusion period. In step 627, the timer (see FIG. 6E) is set to the earliest time with the type of "start" and the measurement data point is copied to the adjudicated measurement data in step 628 with no change made to the measurement data point. The adjudicated measurement data is outputted in step 629 and the process continues with step 607 of FIG. 6A.

If inquiry step 625 determines that the earliest time is not the start time, the timer (see FIG. 6E) is set to the earliest time with the type of "end" in step 630. The current measurement data point falls within the exclusion period and the adjudicated measurement data point is set to be null in step 631 and outputted in step 629. The process then continues with step 607 of FIG. 6A.

If inquiry step 626 determines that the earliest time is not greater than the current time, then the adjudicated measurement data point is set to be null in step 631 and outputted in step 629. The process then continues with step 607 of FIG. 6A.

FIG. 6E includes a timer process starting at step 640 for the timer that is set either in step 627 (see FIG. 6D) or step 630 (see FIG. 6D) depending on the determination of a start time or an end time, respectively, for the earliest outstanding exclusion period (see step 625 of FIG. 6D). The timer is set to go off when the outstanding exclusion period starts or ends. If inquiry step 641 determines that the timer goes off, then inquiry step 642 checks the service state. If step 642 determines that the service state is up, the process repeats starting at step 622 (see FIG. 6C), which includes a refresh of the outstanding exclusion instruction array.

If step 642 determines that the service state is down and inquiry step determines that the timer type is "start", then step 644 inserts a new "Adjudicated Service Up" adjudicated measurement data point at the start time of the earliest outstanding exclusion period. The new adjudicated measurement data point is to be used to inform the service level evaluator to stop counting down time. In one thread from step 644, the new data point is output in step 629 (see FIG. 6D) and the process continues in step 607 of FIG. 6A. At the same time, the flow from step 644 also goes in another, separate thread to step 622 (see FIG. 6C) to repeat the process if the exclusions[ ] array is not empty.

If step 642 determines that the service state is down and step 643 determines that the timer type is "end", step 645 inserts a new "Adjudicated Service Down" adjudicated measurement data point at the end time of the earliest outstanding exclusion period. The new adjudicated measurement data point is to be used to inform the service level evaluator to start counting down time. In one thread from step 645, the new data point is output in step 629 (see FIG. 6D) and the process continues with step 607 of FIG. 6A. At the same time, the flow from step 645 also goes in another, separate thread to step 622 (see FIG. 6C) to repeat the process if the exclusions[ ] array is not empty.

EXAMPLE

As an example of the process of FIGS. 6C-6E, consider sequences 340 of FIG. 3C. At time t1, measurement data is input and step 621 of FIG. 6C sets the service state to be the Down indicator (see the down arrow indicating the service being down at t1 in sequence 341 of FIG. 3C). Outstanding exclusion instructions associated with the exclusion period 342a (see FIG. 3C) are retrieved and placed into the exclusions array in step 622 (see FIG. 6C). Start time ta of exclusion period 342a (see FIG. 3C) is determined in step 624 of FIG. 6C to be the earliest time of the start and end times of the exclusion period. After going through the Yes branches of steps 625 (i.e., the earliest time is a start time) and 626 (i.e., the earliest time is in the future) of FIG. 6D, the timer is set in step 627 of FIG. 6D to the earliest time (i.e., time ta) with the type being assigned the Start indicator. Step 628 (see FIG. 6D) produces an adjudicated measurement data point for the measurement data point at t1. Because the exclusion period start is in the future, the adjudicated measurement data generated in step 628 is the same as the original measurement data. In step 629, the data point generated in step 628 is outputted to step 607 of FIG. 6A.

For this example, there is no other measurement data coming in prior to the start of exclusion period 342a (see sequences 340 of FIG. 3C), so the next activity is the timer going off in response to the current time being the start of the exclusion period (i.e., time ta). At time ta, the timer goes off in step 641 (see FIG. 6E), step 642 (see FIG. 6E) determines that the service state is Down (see service state sequence 343 of FIG. 3C), step 643 (see FIG. 6E) determines that the type is the Start indicator, and step 644 (see FIG. 6E) produces and inserts an Adjudicated Service Up adjudicated measurement data point associated with time ta (see the up arrow at time ta in adjudicated measurement data sequence 344 of FIG. 3C). After step 644 (see FIG. 6E), one thread outputs the Adjudicated Service Up adjudicated measurement data point at step 629 (see FIG. 6D), and the processing continues with step 607 of FIG. 6A, where an evaluation of down time is performed. Another thread from step 644 (see FIG. 6E) repeats the process starting at step 622 of FIG. 6C, which checks for any outstanding exclusion instructions. The same exclusion period whose start time had been set to the earliest time previously in this example is still an outstanding exclusion period because at this point in time, the period has started but has not ended. Therefore, the exclusions array is determined to be not empty in step 623 (see FIG. 6C) and step 624 (see FIG. 6C) determines the earliest time to be the end time of exclusion period 342a (i.e., time tb, see FIG. 3C). Step 625 (see FIG. 6D) then determines that the earliest time is not a start time and step 630 (see FIG. 6D) sets the timer to the earliest time (i.e., time tb) and the type is set to the End indicator. Step 631 (see FIG. 6D) sets the adjudicated measurement data to null, step 629 (see FIG. 6D) outputs the null value, and the process continues with step 607 of FIG. 6A.

There is no measurement data being input between time to and time tb (see sequences 340 of FIG. 3C), so the next activity is the timer going off in response to the current time being the end time of exclusion period 342a (i.e., time tb, see FIG. 3C). At time tb, the timer goes off in step 641 (see FIG. 6E), step 642 (see FIG. 6E) determines that the service state is still Down (see service state sequence 343 of FIG. 3C), step 643 (see FIG. 6E) determines that the type is not start, and step 645 (see FIG. 6E) generates and inserts a new adjudicated measurement data point (i.e., Adjudicated Service Down) associated with time tb (see the down arrow at time tb in adjudicated measurement data sequence 344 of FIG. 3C). Step 645 also removes the current exclusion adjudication instruction from the exclusions array. After step 645 (see FIG. 6E), one thread outputs the Adjudicated Service Down adjudicated measurement data point at step 629 (see FIG. 6D), and the processing continues with step 607 of FIG. 6A where a down time evaluation is performed (see the down time calculation 345 in FIG. 3C). Another thread from step 645 (see FIG. 6E) repeats the process starting at step 622 of FIG. 6C, which checks for any other outstanding exclusion instructions in step 622 (see FIG. 6C). In this example, step 623 (see FIG. 6C) determines that the exclusions array is now empty. Without setting the timer, the process continues with step 631 (see FIG. 6D), which assigns a null value to the adjudicated measurement data, step 629 (see FIG. 6D) outputs the null value, and the process continues with step 607 of FIG. 6A.

It should be noted that the loop starting at step 622 of FIG. 6C applies to exclusion adjudication, but not to other types such as modification or insertion adjudication. In one embodiment, multiple adjudication instructions apply to the same piece of measurement data and those multiple adjudication instructions are of multiple types, including at least one instruction of an exclusion type and at least one instruction of a non-exclusion type. In this case, the loop from step 605 of FIG. 6A to step 609 of FIG. 6B applies the non-exclusion adjudication instruction(s) and the loop starting at step 622 (see FIG. 6C) applies the exclusion adjudication instruction(s).

Real Time Segmented Re-Adjudication

Figure 7A:
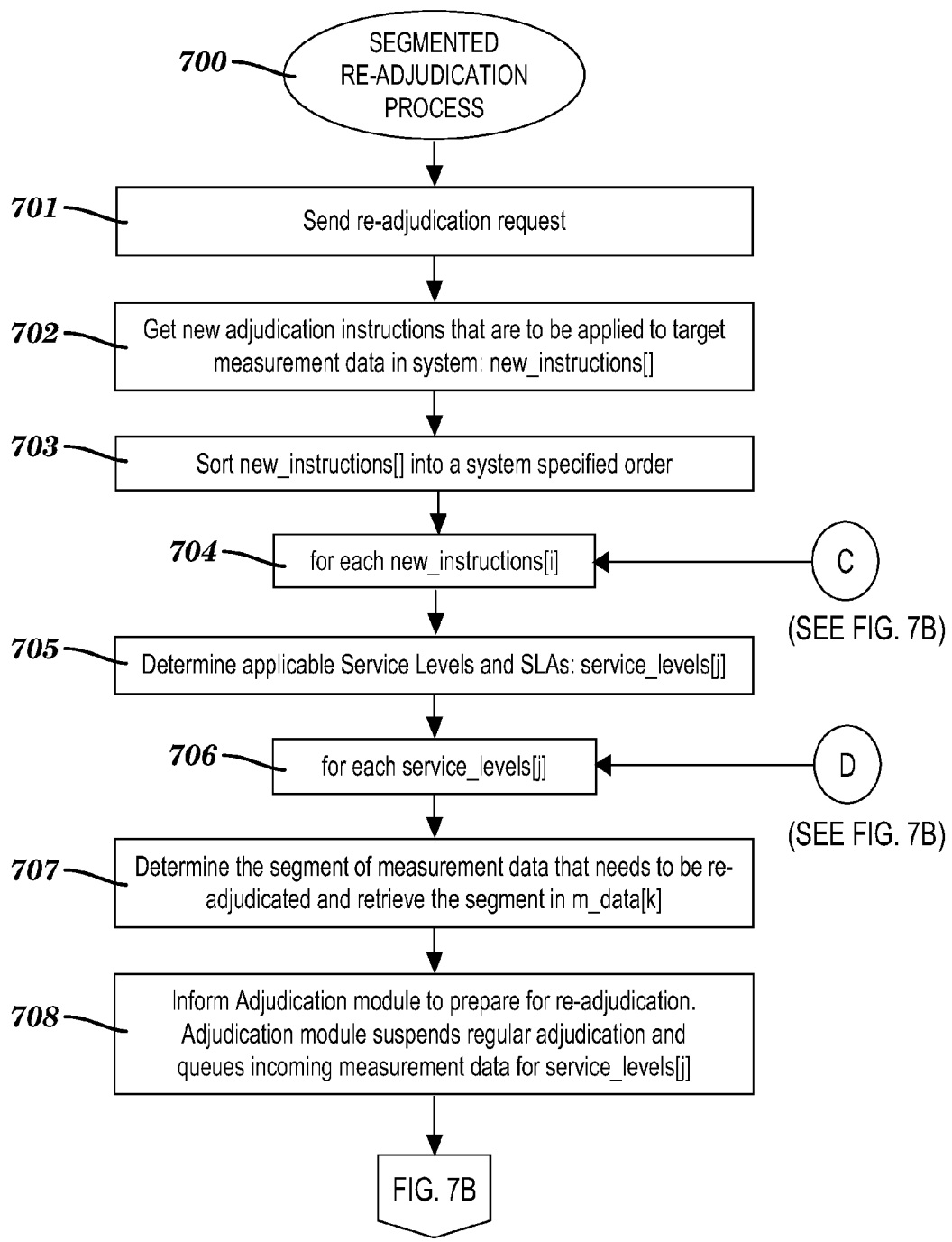
FIGS. 7A-7B depict a flow diagram of a process of segmented re-adjudication of measurement data streams in real time in the system of FIG. 1 or FIG. 2, in accordance with embodiments of the present invention.
Figure 7B:
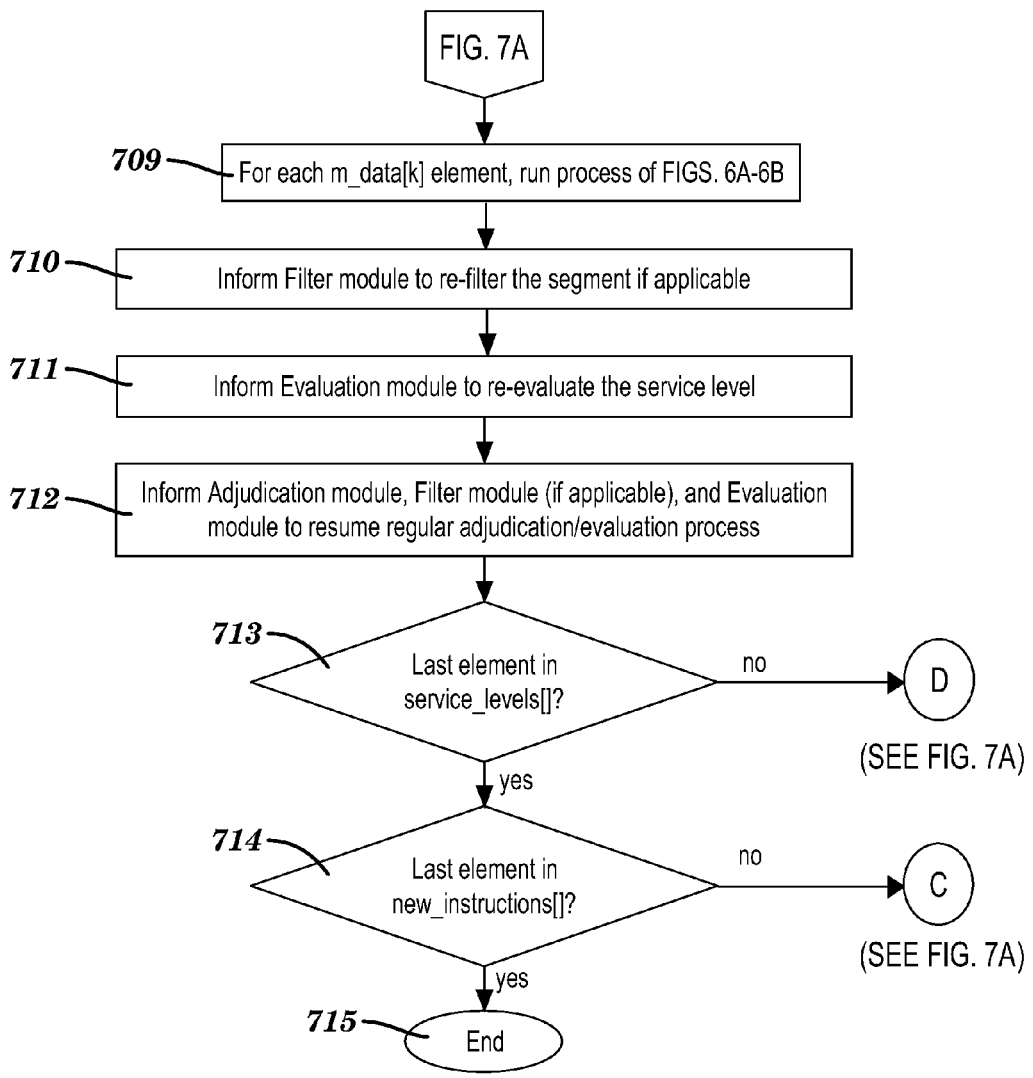

FIGS. 7A-7B depict a flow diagram of a process of segmented re-adjudication of measurement data streams in real time in the system of FIG. 1 or FIG. 2, in accordance with embodiments of the present invention. The process of FIGS. 7A-7B is controlled by re-adjudication control module 111 (see FIG. 1) or 211 (see FIG. 2). The segmented re-adjudication process begins at step 700. In step 701, a re-adjudication request is sent from re-adjudication trigger 110 (see FIG. 1) or 210 (see FIG. 2) to re-adjudication control module 111 (see FIG. 1) or 211 (see FIG. 2). Step 702 retrieves one or more new adjudication instructions to be applied to measurement data that have already been processed in system 100 (see FIG. 1) or 200 (see FIG. 2). The retrieval of the new adjudication instruction(s) is performed in response to the re-adjudication request of step 701 or a query to adjudication instruction store 109 (see FIG. 1) or 209 (see FIG. 2). Similar to step 604 of FIG. 6A, step 703 sorts the retrieved adjudication instructions into a system-specified order. Step 704 starts a loop performed for each new adjudication instruction in the sorted order. The step 704 loop includes steps 705 through 714 of FIG. 7B. In step 705, the system determines service levels and associated SLA contracts to which the new adjudication instruction applies.

Step 706 then starts another loop performed for each of the service levels determined in step 705. The step 706 loop includes steps 707 through 713 of FIG. 7B. For a given adjudication instruction determined by the step 704 loop and a given service level determined by the step 706 loop, step 707 determines a corresponding segment of the measurement data stream that needs to be re-adjudicated and retrieves that corresponding segment of the measurement data into m_data[k] accordingly. The corresponding segment is (1) a segment of the original measurement data 101 (see FIG. 1) or 201 (see FIG. 2) retrieved from original measurement data store 102 (see FIG. 1) or 202 (see FIG. 2) or (2) a segment of the most recently adjudicated measurement data if incremental adjudication is being employed by the system. In step 708, the system informs adjudication module 103 (see FIG. 1) or 203 (see FIG. 2) to prepare for a re-adjudication. Adjudication module 103 (see FIG. 1) or 203 (see FIG. 2) suspends its regular adjudication process and queues the incoming measurement data for service_levels[j] in a temporary store.

The adjudication module 103 (see FIG. 1) or 203 (see FIG. 2) then starts re-adjudication in step 709 of FIG. 7B by inputting the measurement data segment determined and retrieved in step 707 into the process of FIGS. 6A-6B, which utilizes adjudication module 103 (see FIG. 1) or 203 (see FIG. 2). If system 200 (see FIG. 2) is performing the process of FIGS. 7A-7B, then after the corresponding adjudicated measurement data is updated in step 709, step 710 informs filter/transform module 205 (see FIG. 2) to re-filter and/or re-transform the segment. Step 711 informs evaluation module 107 (see FIG. 1) or 207 (see FIG. 2) to update its evaluation results (i.e., re-evaluate the service level). If system 100 is performing the process of FIGS. 7A-7B, then the step 711 update uses the updated adjudicated measurement data of step 709. If system 200 is performing the process of FIGS. 7A-7B, then the step 711 update uses the updated and filtered adjudicated measurement data of step 710. Subsequent to step 711, step 712 informs adjudication module 103 (see FIG. 1) or 203 (see FIG. 2), filter/transform module 205 if applicable (see FIG. 2), and evaluation module 107 (see FIG. 1) or 207 (see FIG. 2) to resume the regular adjudication and evaluation process for the subject service level, starting from the queued incoming measurement streams (i.e., the streams queued in step 708).

After step 712, the re-adjudication process for the given service level and the given new adjudication instruction ends. Inquiry step 713 checks if all the applicable service levels have been processed. If the answer to inquiry step 713 is no, the process continues with the next iteration of the step 706 loop to process the next applicable service level. If the answer to inquiry step 713 is yes, the process proceeds to inquiry step 714, which checks if all the new adjudication instructions have been applied. If the answer to inquiry step 714 is no, the process continues with the next iteration of the step 704 loop to process the next adjudication instruction. If the answer to inquiry step 714 is yes, the segmented re-adjudication process ends at step 715.

As described above in step 604 of FIG. 6A and step 703 of FIG. 7A, the applicable adjudication instructions to a measurement data point are applied in a system specified order. In embodiments of the present invention, the aforementioned ordering is based on the applicable adjudication instructions' times of creation, submission to or reception at system 100 (see FIG. 1) or 200 (see FIG. 2). As a result of this ordering, the effect of a new adjudication instruction can overwrite old (i.e., previously processed) adjudication instructions.

Incremental Adjudication

In one embodiment, the aforementioned ordering of the adjudication instructions enables incremental adjudication during re-adjudication. To enable incremental adjudication, step 707 of FIG. 7A is modified to retrieve the corresponding adjudicated measurement data segment from adjudicated measurement data store 104 (see FIG. 1) or 204 (see FIG. 2), instead of the original measurement data segment from original measurement data store 102 (see FIG. 1) or 202 (see FIG. 2). The enablement of incremental adjudication also modifies step 602 of FIG. 6A to retrieve only the new adjudication instructions that have not been applied to the subject measurement data points of modified step 707. That is, each time a new adjudication instruction is submitted to the system, adjudication is performed by automatically applying in real time the new adjudication instruction to the retrieved adjudicated measurement data and not to raw measurement data.

It should be noted that incremental adjudication requires storage of the adjudicated measurement data per SLA. Thus, to use system 200 (see FIG. 2) to support incremental adjudication, adjudicated measurement data store 204 (see FIG. 2) must be changed from being optional to being a required component of system 200 (see FIG. 2).

It should be noted that re-adjudication of individual service levels of different SLA contracts in the process of FIGS. 7A-7B can be performed in parallel, since the service levels are independent of one another. Also, re-adjudication of a service level of a SLA contract does not affect the regular process of other service levels as long as the evaluations of the service levels are independent of one another.

In one embodiment, a plurality of new adjudication instructions are received by system 100 (see FIG. 1) or 200 (see FIG. 2), where the new adjudication instructions are each associated with a first set of stored adjudicated measurement data points, but have not yet been applied thereto. In this case, incremental adjudication includes retrieving the first set of one or more adjudicated measurement data points and automatically applying in real time and in a system-specified order the new adjudication instructions to the retrieved adjudicated measurement data points. The application of the new adjudication instructions generates a second set of one or more adjudicated measurement data points, where the generation of the second set utilizes the first set, but does not utilize the original measurement data points 101 (see FIG. 1) or 201 (see FIG. 2).

Computing System

Figure 8:
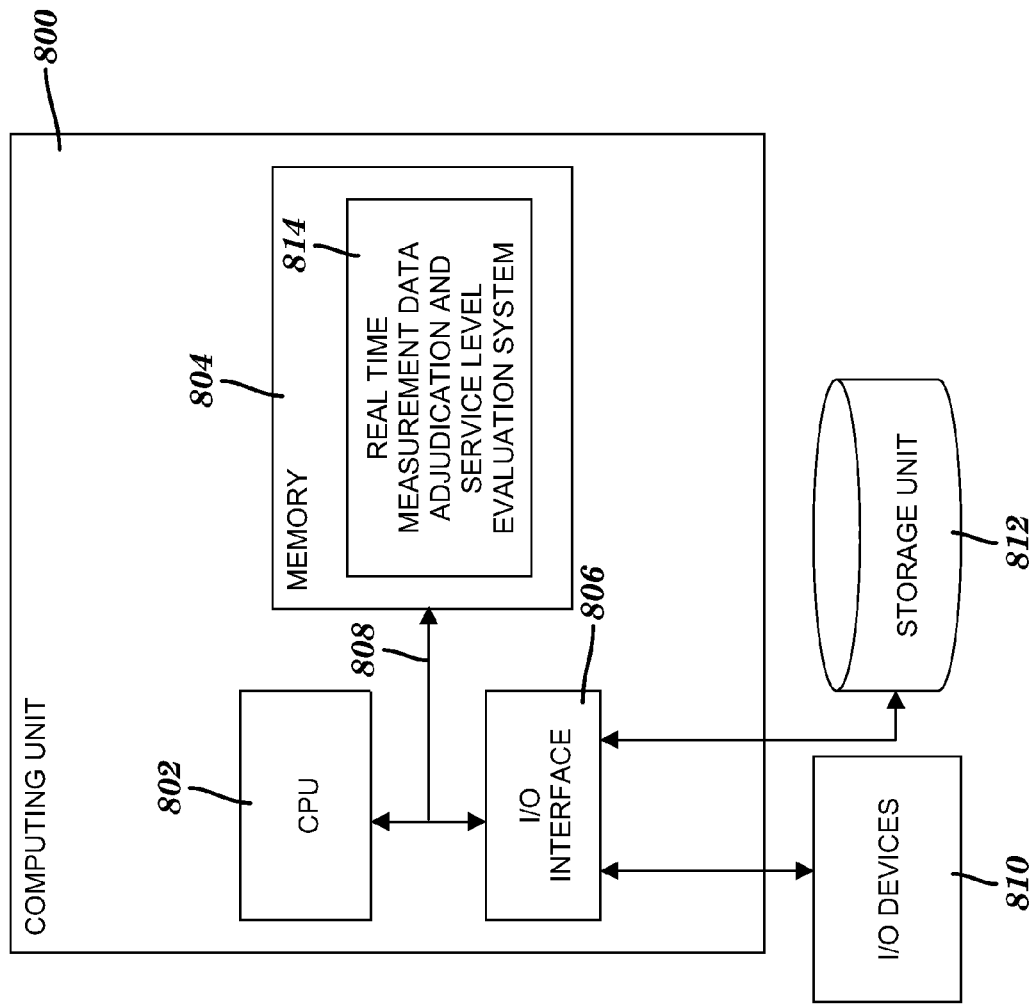
FIG. 8 is a block diagram of a computing unit that is included in the system of FIG. 1 or FIG. 2, and that implements the adjudication process of FIGS. 6A-6B and the segmented re-adjudication process of FIGS. 7A-7B, in accordance with embodiments of the present invention.

FIG. 8 is a block diagram of a computing unit that is included in the system of FIG. 1 or FIG. 2, and that implements the adjudication process of FIGS. 6A-6B and the segmented re-adjudication process of FIGS. 7A-7B, in accordance with embodiments of the present invention. Computing unit 800 generally comprises a central processing unit (CPU) 802, a memory 804, an input/output (I/O) interface 806, a bus 808, I/O devices 810 and a storage unit 812. CPU 802 performs computation and control functions of computing device 800. CPU 802 may comprise a single processing unit, or be distributed across one or more processing units in one or more locations (e.g., on a client and server).

Memory 804 may comprise any known type of data storage and/or transmission media, including magnetic media, optical media, random access memory (RAM), read-only memory (ROM), a data cache, a data object, etc. Local memory elements of memory 804 are employed during actual execution of a real time measurement data adjudication and service level evaluation system 814. Cache memory elements of memory 804 provide temporary storage of at least some program code in order to reduce the number of times code must be retrieved from bulk storage during execution. Storage unit 812 is, for example, a magnetic disk drive or an optical disk drive capable of being original measurement data store 102 (see FIG. 1) or 202 (see FIG. 2), adjudicated measurement data store 104 (see FIG. 1) or 204 (see FIG. 2), or adjudication instruction store 109 (see FIG. 1) or 209 (see FIG. 2). Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device, such as a non-volatile storage device (e.g., a CD-ROM drive which receives a CD-ROM disk) (not shown). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes computer program code comprising real time measurement data adjudication and service level evaluation system 814 that implements the logic of the processes of FIGS. 6A-6B and FIGS. 7A-7B. Further, memory 804 may include other systems not shown in FIG. 8, such as an operating system (e.g., Linux) that runs on CPU 802 and provides control of various components within and/or connected to computing unit 800.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 814 for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. For example, the re-adjudication process of FIGS. 7A-7B has two iteration loops: the step 704 loop processes each new adjudication instruction and the step 706 loop is an inner loop within the step 704 loop that processes each service level. As an alternative, one may choose to iterate service levels before new adjudication instructions in cases where there are multiple new adjudication instructions against a single SLA contract. One may also choose to move steps 711 and 712 out of the new adjudication iteration loop so that re-evaluation is carried out after all the new adjudication instructions are applied. Accordingly, the appended claims are intended to encompass all such modifications and changes as fall within the true spirit and scope of this invention.

What is claimed is:

1. A process for supporting computing infrastructure, the process comprising a first computer system providing at least one support service for at least one of creating, integrating, hosting, maintaining, and deploying computer-readable code in a second computer system comprising a processor, said computer-readable code containing instructions, wherein said instructions, when carried out by a processor of said second computer system, implement a method of adjudicating measurement data and evaluating service levels in real time, said method comprising the steps of:

said second computer system receiving a first adjudication instruction, said first adjudication instruction associated with a service level obligation specified by a service level agreement (SLA) between a provider of a computing service and a requester of said computing service, said service level obligation having a target value specified by said SLA, wherein said first adjudication instruction specifies a start time and an end time for an exclusion period during which an outage of said computing service is planned;

said second computer system receiving a plurality of measurement data points, wherein said receiving said plurality of measurement data points includes receiving a first measurement data point of said plurality of measurement data points;

said second computer system adjudicating each measurement data point of said plurality of measurement data points in response to each measurement data point being received at said second computer system via said receiving said plurality of measurement data points, said adjudicating including automatically applying in real time said first adjudication instruction to said first measurement data point in response to said receiving said first measurement data point, wherein said automatically applying includes:

said second computer system determining said start time for said exclusion period is an earliest time of a plurality of start times and a plurality of end times that specify a plurality of exclusion periods including said exclusion period;

said second computer system determining said earliest time is greater than a current time;

based on said start time being determined to be said earliest time and based on said earliest time being determined to be greater than said current time, said second computer system starting a timer that is set to go off at said earliest time and that specifies a type of said earliest time indicates a time at which a corresponding exclusion period of said plurality of exclusion periods starts;

subsequent to said starting said timer, said second computer system determining said timer goes off at said start time for said exclusion period;

said second computer system determining said computing service is down at said start time for said exclusion period;

said second computer system determining said type indicates said time at which said corresponding exclusion period starts; and based on said computing service being determined to be down at said start time for said exclusion period and based on said type being determined to indicate said time at which said corresponding exclusion period starts, said second computer system generating said first adjudicated measurement data point that indicates a start of a period of not counting down time of said computing service even though said computing service is determined to be down; and second computer system evaluating a service level attainment of said computing service subsequent to said automatically applying, said evaluating being based on said first adjudicated measurement data point indicating said start of said period of not counting said down time of said computing service even though said computing service is determined to be down, and said evaluating including calculating said service level attainment and comparing said service level attainment to said target value.

2. The process of claim 1, wherein said method further comprises:

storing, in a first data store coupled to said second computer system, said plurality of measurement data points in response to said receiving said plurality of measurement data points;

subsequent to said evaluating, said second computer system receiving a second adjudication instruction associated with a past time period in which one or more measurement data points of said plurality of measurement data points were received via said receiving said plurality of measurement data points;

said second computer system retrieving said first measurement data point from said first data store;

said second computer system re-adjudicating said first measurement data point in response to said retrieving, said re-adjudicating including automatically applying in real time said second adjudication instruction to said first measurement data point, said automatically applying said second adjudication instruction including generating a second adjudicated measurement data point; and said second computer system re-evaluating said service level attainment subsequent to said automatically applying said second adjudication instruction, said re-evaluating being based on said second adjudicated measurement data point, and said re-evaluating including re-calculating said service level attainment and re-comparing said re-calculated service level attainment to said target value.

3. The process of claim 1, wherein said method further comprises:

said second computer system generating a first set of one or more adjudicated measurement data points via said adjudicating each measurement data point of said plurality of adjudicated measurement data points;

said second computer system storing said first set of one or more adjudicated measurement data points in a data store coupled to said second computer system;

subsequent to said evaluating, said second computer system receiving a second adjudication instruction associated with said first set of one or more adjudicated measurement data points, said second adjudication instruction not having been applied to said first set of one or more adjudicated measurement data points at a time of said receiving said second adjudication instruction;

said second computer system retrieving said first set of one or more adjudicated measurement data points from said data store and in response to said receiving said second adjudication instruction; and said second computer system incrementally adjudicating said first set, said incrementally adjudicating including automatically applying in real time said second adjudication instruction to said first set of one or more adjudicated measurement data points, said automatically applying said second adjudication instruction including generating a second set of one or more adjudicated measurement data points, said generating based on said first set and not on said plurality of measurement data points.

4. The process of claim 3, wherein said method further comprises:

subsequent to said evaluating, said second computer system receiving a plurality of new adjudication instructions including said second adjudication instruction, said plurality of new adjudication instructions associated with said first set, said plurality of new adjudication instructions not having been applied to said first set at a time of said receiving said plurality of new adjudication instructions, wherein said incrementally adjudicating further includes automatically applying, in real time and in an order specified by said second computer system, said plurality of new adjudication instructions to said first set, said automatically applying said plurality of new adjudication instructing including generating a third get of one or more adjudicated measurement data points, said generating said third set based on said first set and not on said plurality of measurement data points.

5. The process of claim 1, wherein said receiving said plurality of measurement data points further includes receiving a second measurement data point of said plurality of measurement data points subsequent to said receiving said first measurement data point, and wherein said automatically applying is performed in parallel with said receiving said second measurement data point.

6. The process of claim 1, wherein said automatically applying includes inserting said first adjudicated measurement data point as a new measurement data point in said plurality of measurement data points.

7. The process of claim 1, wherein said method further comprises:

said second computer system generating a plurality of adjudicated measurement data points via said adjudicating each measurement data point of said plurality of measurement data points; and said second computer system filtering out redundant data points in said plurality of adjudicated measurement data points, said filtering out resulting in reducing data storage required by said second computer system and resulting in reducing computation cycles performed by said second computer system.

8. A computing system comprising:

a central processing unit (CPU);

a memory coupled to said CPU;

a tangible, computer-readable storage device coupled to said CPU, said storage device containing instructions that are carried out by said CPU via said memory to implement a method of re-adjudicating a segment of a measurement data stream, said method comprising:

said computing system receiving a measurement data stream, said measurement data stream including a plurality of segments;

said computing system adjudicating said measurement data stream, said adjudicating producing an adjudicated measurement data stream based on one or more adjudication instructions, and said adjudicating associated with one or more service level obligations and one or more service level agreements (SLAs);

said computing system evaluating one or more service level attainments, said evaluating based on said adjudicated measurement data, said evaluating including calculating a service level attainment of said one or more service level attainments and comparing said service level attainment to one or more targets of a service level obligation of said one or more service level obligations;

said computing system receiving an adjudication instruction subsequent to said evaluating, said adjudication instruction not included in said one or more adjudication instructions;

said computing system identifying, via said received adjudication instruction, said service level obligation, an SLA of said one or more SLAs, said SLA associated with said service level obligation, and a segment of said plurality of segments, said segment requiring re-adjudication based on said received adjudication instruction;

said computing system suspending a portion of said adjudicating associated with said service level obligation and said SLA;

queuing a portion of said measurement data stream associated with said service level obligation and associated with said SLA in a data store of said computing system;

retrieving a set of measurement data associated with said segment; and re-adjudicating said retrieved set of measurement data, said re-adjudicating including applying said adjudication instruction to said retrieved set of measurement data to produce re-adjudicated measurement data.

9. The computing system of claim 8, wherein said retrieving said set of measurement data comprises:

said computing system retrieving one or more measurement data points included in said segment if an incremental adjudication process is not utilized by said computing system; and said computing system retrieving one or more adjudicated measurement data points included in a segment of said adjudicated measurement data stream, if said incremental adjudication process is utilized by said computing system, wherein said segment of said adjudicated measurement data stream is associated with said segment of said plurality of segments.

10. The computing system of claim 9, wherein said re-adjudicating comprises said computing system generating an adjudicated segment associated with said segment of said plurality of segments, wherein said generating is based on:

applying, to said retrieved one or more measurement data points, said adjudication instruction and any adjudication instruction of said one or more adjudication instructions that is associated with said retrieved one or more measurement data points, if said incremental adjudication process is utilized by said computing system; and applying, to said retrieved one or more adjudicated measurement data points, said adjudication instruction and no adjudication instruction of said one or more adjudication instructions, if said incremental adjudication process is utilized by said computing system.

11. The computing system of claim 10, wherein said method further comprises:

said computing system filtering said segment of said plurality of segments to generate a first set of filtered adjudicated measurement data;

said computing system storing said first set of filtered adjudicated measurement data;

said computing system filtering said adjudicated segment to generate a second set of filtered adjudicated measurement data; and said computing system replacing said first set of filtered adjudicated measurement with said second set of filtered adjudicated measurement data.

12. The computing system of claim 8, wherein said method further comprises:

said computing system re-calculating said service level attainment based on said re-adjudicated measurement data;

said computing system re-comparing said re-calculated service level attainment to said one or more targets; and said computing system resuming said portion of said adjudicating associated with said service level obligation and said SLA, said resuming including retrieving said portion from said data store.

13. A computer program product comprising a computer-readable, tangible storage device having a computer-readable program code containing instructions that when carried out by a processor of a computing system implement a method of re-adjudicating a segment of a measurement data stream, said method comprising:

said computing system receiving a measurement data stream, said measurement data stream including a plurality of segments;

said computing system adjudicating said measurement data stream, said adjudicating producing an adjudicated measurement data stream based on one or more adjudication instructions, and said adjudicating associated with one or more service level obligations and one or more service level agreements (SLAs);

said computing system evaluating one or more service level attainments, said evaluating based on said adjudicated measurement data, said evaluating including calculating a service level attainment of said one or more service level attainments and comparing said service level attainment to one or more targets of a service level obligation of said one or more service level obligations;

said computing system receiving an adjudication instruction subsequent to said evaluating, said adjudication instruction not included in said one or more adjudication instructions;

said computing system identifying, via said received adjudication instruction, said service level obligation, an SLA of said one or more SLAs, said SLA associated with said service level obligation, and a segment of said plurality of segments, said segment requiring re-adjudication based on said received adjudication instruction;

said computing system suspending a portion of said adjudicating associated with said service level obligation and said SLA;

queuing a portion of said measurement data stream associated with said service level obligation and associated with said SLA in a data store of said computing system;

retrieving a set of measurement data associated with said segment; and re-adjudicating said retrieved set of measurement data, said re-adjudicating including applying said adjudication instruction to said retrieved set of measurement data to produce re-adjudicated measurement data.

14. The program product of claim 13, wherein said retrieving said set of measurement data comprises:

said computing system retrieving one or more measurement data points included in said segment if an incremental adjudication process is not utilized by said computing system; and said computing system retrieving one or more adjudicated measurement data points included in a segment of said adjudicated measurement data stream, if said incremental adjudication process is utilized by said computing system, wherein said segment of said adjudicated measurement data stream is associated with said segment of said plurality of segments.

15. The program product of claim 14, wherein said re-adjudicating comprises said computing system generating an adjudicated segment associated with said segment of said plurality of segments, wherein said generating is based on:

applying, to said retrieved one or more measurement data points, said adjudication instruction and any adjudication instruction of said one or more adjudication instructions that is associated with said retrieved one or more measurement data points, if said incremental adjudication process is utilized by said computing system; and applying, to said retrieved one or more adjudicated measurement data points, said adjudication instruction and no adjudication instruction of said one or more adjudication instructions, if said incremental adjudication process is utilized by said computing system.

16. The program product of claim 15, wherein said method further comprises:

said computing system filtering said segment of said plurality of segments to generate a first set of filtered adjudicated measurement data;

said computing system storing said first set of filtered adjudicated measurement data;

said computing system filtering said adjudicated segment to generate a second set of filtered adjudicated measurement data; and said computing system replacing said first set of filtered adjudicated measurement with said second set of filtered adjudicated measurement data.

17. The program product of claim 13, wherein said method further comprises:

said computing system re-calculating said service level attainment based on said re-adjudicated measurement data;

said computing system re-comparing said re-calculated service level attainment to said one or more targets; and said computing system resuming said portion of said adjudicating associated with said service level obligation and said SLA, said resuming including retrieving said portion from said data store.

18. A process for supporting computing infrastructure, the process comprising a first computer system providing at least one support service for at least one of creating, integrating, hosting, maintaining, and deploying computer-readable code in a second computer system comprising a processor, said computer-readable code containing instructions, wherein said instructions, when carried out by a processor of said second computer system, implement a method of re-adjudicating a segment of a measurement data stream, said method comprising:

said second computer system receiving a measurement data stream, said measurement data stream including a plurality of segments;

said second computer system adjudicating said measurement data stream, said adjudicating producing an adjudicated measurement data stream based on one or more adjudication instructions, and said adjudicating associated with one or more service level obligations and one or more service level agreements (SLAs);

said second computer system evaluating one or more service level attainments, said evaluating based on said adjudicated measurement data, said evaluating including calculating a service level attainment of said one or more service level attainments and comparing said service level attainment to one or more targets of a service level obligation of said one or more service level obligations;

said second computer system receiving an adjudication instruction subsequent to said evaluating, said adjudication instruction not included in said one or more adjudication instructions;

said second computer system identifying, via said received adjudication instruction, said service level obligation, an SLA of said one or more SLAs, said SLA associated with said service level obligation, and a segment of said plurality of segments, said segment requiring re-adjudication based on said received adjudication instruction;

said second computer system suspending a portion of said adjudicating associated with said service level obligation and said SLA;

queuing a portion of said measurement data stream associated with said service level obligation and associated with said SLA in a data store of said second computer system;

retrieving a set of measurement data associated with said segment; and re-adjudicating said retrieved set of measurement data, said re-adjudicating including applying said adjudication instruction to said retrieved set of measurement data to produce re-adjudicated measurement data.

19. The process of claim 18, wherein said retrieving said set of measurement data comprises:

said second computer retrieving one or more measurement data points included in said segment if an incremental adjudication process is not utilized by said second computer system; and said second computer system retrieving one or more adjudicated measurement data points included in a segment of said adjudicated measurement data stream, if said incremental adjudication process is utilized by said second computer system, wherein said segment of said adjudicated measurement data stream is associated with said segment of said plurality of segments.

20. The process of claim 19, wherein said re-adjudicating comprises said second computer system generating an adjudicated segment associated with said segment of said plurality of segments, wherein said generating is based on:

applying, to said retrieved one or more measurement data points, said adjudication instruction and any adjudication instruction of said one or more adjudication instructions that is associated with said retrieved one or more measurement data points, if said incremental adjudication process is utilized by said second computer system; and applying, to said retrieved one or more adjudicated measurement data points, said adjudication instruction and no adjudication instruction of said one or more adjudication instructions, if said incremental adjudication process is utilized by said second computer system.

* * * * *